United States Patent
Krumm et al.

(10) Patent No.: US 7,738,881 B2
(45) Date of Patent: Jun. 15, 2010

(54) SYSTEMS FOR DETERMINING THE APPROXIMATE LOCATION OF A DEVICE FROM AMBIENT SIGNALS

(75) Inventors: John C. Krumm, Redmond, WA (US); Gerald F. Cermak, Bothell, WA (US); Eric J. Horvitz, Kirkland, WA (US); Edward C. Miller, Bellevue, WA (US); Adel Amin AbdelAzim Youssef, Hyattsville, MD (US)

(73) Assignee: Microsoft Corporation, Redmond, WA (US)

( * ) Notice: Subject to any disclaimer, the term of this patent is extended or adjusted under 35 U.S.C. 154(b) by 1226 days.

(21) Appl. No.: 10/741,783

(22) Filed: Dec. 19, 2003

(65) Prior Publication Data

US 2005/0020277 A1    Jan. 27, 2005

Related U.S. Application Data

(60) Provisional application No. 60/489,274, filed on Jul. 22, 2003.

(51) Int. Cl.
*H04W 24/00* (2009.01)
(52) U.S. Cl. ............... 455/456.1; 340/993; 342/357.01; 342/357.08; 342/450; 342/451; 342/457; 455/456.2; 455/456.3; 455/456.5; 455/456.6; 455/404.2; 455/556
(58) Field of Classification Search ............. 455/456.1, 455/456.2, 456.3, 456.5, 456.6, 404.2, 63.4, 455/556; 342/357, 450, 457, 451, 357.01, 342/357.08; 340/993
See application file for complete search history.

(56) References Cited

U.S. PATENT DOCUMENTS

| | | | | |
|---|---|---|---|---|
| 5,365,456 A | * | 11/1994 | Subbiah | .................. 703/5 |
| 5,493,692 A | | 2/1996 | Theimer et al. | |
| 5,544,321 A | | 8/1996 | Theimer et al. | |
| 5,555,376 A | | 9/1996 | Theimer et al. | |

(Continued)

FOREIGN PATENT DOCUMENTS

DE         35 16 357 A        11/1986

(Continued)

OTHER PUBLICATIONS

Microsoft PressPass, "Micorsoft Launches Smart Personal Object Technology Initiatives" Nov. 2002, 4 pages.

(Continued)

*Primary Examiner*—Huy Phan
*Assistant Examiner*—Shantell Heiber
(74) *Attorney, Agent, or Firm*—Lee & Hayes, PLLC

(57) ABSTRACT

The present invention leverages changes in the sensed strength of radio signals at different locations to determine a device's location. In one instance of the present invention, inference procedures are used to process ambient commercial radio signals, to estimate a location or a probability distribution over the locations of a device. In another instance of the present invention, a system utilizes learning and inference methods that are applied to rank vector of signal strength vectors. Moving to such rank orderings leads to systems that bypass consideration of absolute signal strengths in location calculations. The present invention facilitates approximations for locating a device by providing a system that does not require a substantial number of available ambient signal strengths while still providing useful location inferences in determining locations.

36 Claims, 25 Drawing Sheets

U.S. PATENT DOCUMENTS

| | | | |
|---|---|---|---|
| 5,603,054 | A | 2/1997 | Theimer et al. |
| 5,611,050 | A | 3/1997 | Theimer et al. |
| 5,635,940 | A | 6/1997 | Hickman et al. |
| 5,657,487 | A * | 8/1997 | Doner .................... 455/456.2 |
| 5,732,354 | A | 3/1998 | MacDonald |
| 5,812,865 | A | 9/1998 | Theimer et al. |
| 5,936,571 | A * | 8/1999 | Desjardins ................. 701/213 |
| 6,070,126 | A * | 5/2000 | Kokolus et al. .............. 702/19 |
| 6,085,098 | A | 7/2000 | Moon et al. |
| 6,112,095 | A | 8/2000 | Wax et al. |
| 6,125,446 | A | 9/2000 | Olarig et al. |
| 6,140,964 | A | 10/2000 | Sugiura et al. |
| 6,157,820 | A * | 12/2000 | Sourour et al. .......... 455/226.2 |
| 6,278,404 | B1 | 8/2001 | Niles |
| 6,353,398 | B1 | 3/2002 | Amin et al. |
| 6,414,635 | B1 | 7/2002 | Stewart et al. |
| 6,466,232 | B1 | 10/2002 | Newell et al. |
| 6,513,046 | B1 | 1/2003 | Abbott, III et al. |
| 6,549,915 | B2 | 4/2003 | Abbott, III et al. |
| 6,601,010 | B1 * | 7/2003 | Fowler et al. .............. 702/139 |
| 6,672,506 | B2 | 1/2004 | Swartz et al. |
| 6,741,188 | B1 | 5/2004 | Miller et al. |
| 6,747,675 | B1 | 6/2004 | Abbott et al. |
| D494,584 | S | 8/2004 | Schlieffers et al. |
| 6,791,580 | B1 | 9/2004 | Abbott et al. |
| 6,796,505 | B2 | 9/2004 | Pellaumail et al. |
| 6,801,223 | B1 | 10/2004 | Abbott et al. |
| 6,812,937 | B1 | 11/2004 | Abbott et al. |
| 6,837,436 | B2 | 1/2005 | Swartz et al. |
| 6,842,877 | B2 | 1/2005 | Robarts et al. |
| 6,845,246 | B1 | 1/2005 | Steer |
| 6,941,003 | B2 * | 9/2005 | Ziesig ........................ 382/124 |
| 6,942,402 | B1 * | 9/2005 | Slupe et al. ................... 400/88 |
| 7,010,501 | B1 | 3/2006 | Roslak et al. |
| 7,040,541 | B2 | 5/2006 | Swartz et al. |
| 7,063,263 | B2 | 6/2006 | Swartz et al. |
| 7,171,378 | B2 | 1/2007 | Petrovich et al. |
| 7,195,157 | B2 | 3/2007 | Swartz et al. |
| 7,224,983 | B2 * | 5/2007 | Budka et al. ............. 455/456.1 |
| 7,385,501 | B2 | 6/2008 | Miller et al. |
| 7,525,450 | B2 | 4/2009 | Miller et al. |
| 2001/0030664 | A1 | 10/2001 | Shulman et al. |
| 2001/0040590 | A1 | 11/2001 | Abbott et al. |
| 2001/0040591 | A1 | 11/2001 | Abbott et al. |
| 2001/0041535 | A1 * | 11/2001 | Karmel ...................... 455/12.1 |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0035460 | A1 * | 3/2002 | Hales .......................... 703/13 |
| 2002/0042269 | A1 * | 4/2002 | Cotanis ...................... 455/423 |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0148775 | A1 | 8/2003 | Spriestersbach et al. |
| 2003/0154476 | A1 | 8/2003 | Abbott, III et al. |
| 2004/0022214 | A1 | 2/2004 | Goren et al. |
| 2004/0072577 | A1 | 4/2004 | Myllymaki et al. |
| 2004/0201500 | A1 | 10/2004 | Miller et al. |
| 2005/0020277 | A1 | 1/2005 | Krumm et al. |
| 2005/0034078 | A1 | 2/2005 | Abbott et al. |
| 2005/0266858 | A1 | 12/2005 | Miller et al. |
| 2006/0019676 | A1 | 1/2006 | Miller et al. |
| 2008/0090591 | A1 | 4/2008 | Miller et al. |
| 2008/0091537 | A1 | 4/2008 | Miller et al. |
| 2008/0161018 | A1 | 7/2008 | Miller et al. |

FOREIGN PATENT DOCUMENTS

| | | | |
|---|---|---|---|
| EP | 1 022 578 A | | 7/2000 |
| EP | 1022578 A2 | | 7/2000 |
| EP | 1 035 531 A | | 9/2000 |
| EP | 1 260 829 A | | 11/2002 |
| GB | 2278196 A | | 11/1994 |
| GB | 2 304 250 A | | 3/1997 |
| GB | 2304250 A | | 3/1997 |
| RU | 2126174 C1 | | 2/1999 |
| WO | 9800787 | | 1/1998 |
| WO | WO9931824 A1 | | 6/1999 |

OTHER PUBLICATIONS

R. Niemeijer; Partial European Search Report, EP 04 01 6227; Nov. 5, 2004, The Hague, The Netherlands.

Teemu Roos, et al.; A Probabilistic Approach to WLAN User Location Estimation; International Journal of Wireless. Information Networks, vol. 9, No. 3, Jul. 2002, pp. 155-164, XP-00230370.

Microsoft Presents Smart Personal Objects Technology (SPOT)-Based Wristwatches at CES; Microsoft Presspass; Jan. 9, 2003; XP002304128; http://www.microsoft.com/presspass/press/2003/jan03/01-09SPOTWatches PR.asp.

John Krumm, et al.; RightSPOT: A Novel Sense of Location for a Smart Personal Object; Ubicomp 2003: Ubiquitous Computing. 5th International Conference. Proceedings (Lecture Notes in Computer Science vol. 2864), Oct. 12, 2003, pp. 36-43; XP002304129; Springer-Verlag Berlin, Germany.

R. Niemeijer; Partial European Search Report, EP 04 01 6269; Nov. 5, 2004, The Hague, The Netherlands.

Niemeijer; Partial European Search Report, EP 04 10 3175; Nov. 5, 2004, The Hague, The Netherlands.

John Krumm, et al., RishtSPOT: A Novel Sense of Loction for a Smart Personal Object, UbiComp 2003, Oct. 2003.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Krumm et al., "RightSpot: A Low-Power Location Service for Smart Personal Objects", The 5th International Conference on Ubiquitous Computing (UbiComp), Seattle, WA, Oct. 12-15, 2003, 9 pages.

Roos, et al., "A Probabilistic Approach to WLAN User Location Estimation", International Journal of Wireless Information Networks, vol. 9, No. 3, Jul. 2002, pp. 155-164.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994. pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, pp. 94-104, vol. 265—No. 3.

P. Bahl and V.N. Padmanabhan. Radar: An In-building RF-Based Location and Tracking System. In IEEE INFOCOM 2000, 2000.

J. Krumm, et al. SmartMoveX on a Graph—An Inexpensive Active Badge Tracker. In Ubicomp 2002, 2002.

T. Roos, et al. A Statistical Modeling Approach to Location Estimation. IEEE Transactions on Mobile Computing, 1(1): p. 59-69, 2002.

D. Knuth. Seminumerical Algorithms, in The Art of Computer Programming. Addison-Wesley, Reading, MA, 1981. p. 64 (Algorithm P).

Roos, et al., "A Probabilistic Approach to WLAN User Location Estimation", International Journal of Wireless Information Networks, 2002, vol. 9(3) pp. 155-164.

* cited by examiner

| NUMBER OF RADIO STATIONS = n | BEST SUBSET OF FM RADIO STATIONS | CLASSIFICATION ACCURACY |
|---|---|---|
| 2 | {KPLU, KEXP} | 34.3% |
| 3 | {KWFJ, KEXP, KVTI} | 61.6% |
| 4 | {KWFJ, KEXP, KSER, KVTI} | 72.9% |
| 5 | {KEXP, KSER, KVTI, KBCS, KLSY} | 77.6% |
| 6 | {KVTI, KGHP, KRWM, KLSY, KEXP, KSER} | 76.2% |
| 7 | {KBCS, KEXP, KUBE, KBSG, KVTI, KSER, KLSY} | 79.7% |
| 8 | {KVTI, KSER, KBCS, KJR, KNHC, KEXP, KBSG, KUBE} | 81.7% |
| 9 | {KVTI, KRXY, KPLU, KJR, KBCS, KLSY, KUBE, KSER, KEXP} | 76.8% |

| GROUP | {(frequency (MHz), mean (dbu VOLT), variance)} |
|---|---|
| 1 (12) | {(88.5, 64.2, 18.8), (92.5, 66.3, 18.4), (94.1, 68.2, 17.4), (97.3, 67.1, 17.5), (98.1, 65.2, 18.8), (98.9, 65.2, 18.8), (99.9, 64.8, 19.0), (100.7, 65.2, 18.8), (102.5, 67.6, 19.0), (103.7, 64.2, 19.1), (106.1, 67.4, 17.9), (107.7, 64.7, 19.1)} |
| 2 (7) | {(89.5, 52.9, 19.6), (93.3, 66.3, 19.1), (95.7, 66.0, 19.1), (96.5, 65.7, 19.3), (101.5, 65.6, 19.2), (105.3, 62.8, 19.4), (106.9, 61.2, 19.8)} |
| 3 (3) | {(89.3, 8.5, 21.8), (91.3, 41.0, 21.2), (104.5, 13.8, 22.2)} |
| 4 (2) | {(90.1, 12.9, 24.8), (91.7, 35.2, 27.5)} |
| 5 (2) | {(90.3, 38.6, 22.0), (94.9, 61.8, 21.6)} |
| 6 (1) | {(89.9, 10.0, 26.7)} |
| 7 (1) | {(90.7, 33.9, 25.4)} |

FIG. 11

SYSTEMS FOR DETERMINING THE APPROXIMATE LOCATION OF A DEVICE FROM AMBIENT SIGNALS

REFERENCE TO RELATED APPLICATION

This application claims the benefit of U.S. Provisional Patent Application Ser. No. 60/489,274, which was filed Jul. 22, 2003, entitled SYSTEMS AND METHODS FOR APPROXIMATING A LOCATION OF A DEVICE.

TECHNICAL FIELD

The present invention relates generally to location determination, and more particularly to systems for providing an approximate location of a device utilizing ambient signal strengths.

BACKGROUND OF THE INVENTION

Computers were developed to aid people with repetitive tasks that were deemed to be extremely time consuming. Most of the early computers were used for complex mathematical problem solving. The first computing machines were extremely large compared to computers utilized today. Despite their enormous size, the early machines had vastly less computing power than today's machines. Generally speaking, the sizes of computing devices were driven by the sizes of the existing electronic components of that era. This meant that only large research facilities or big businesses could employ computing machines. As new technology allowed for smaller electronic devices to be developed, computing devices also diminished in size. Although still lacking in power by today's standards, the size of the computing machine was reduced enough that it could be placed on a typical desk. Thus, the "desktop computer" was born. This allowed users to have computing technology available in locations other than a central computing building. People found that having the capability to utilize computing technology at their work desk, rather than submitting computing problems to a central location, made them much more productive at their jobs. Eventually, the idea of moving the desktop computer to the home environment to provide even more convenience for doing work became a reality.

When the computer was brought into the home, it became obvious that there were other uses for it besides work. This allowed people to view the computer as not only a work tool, but also as a helpful device that could be used to play games, aid in learning, handle telecommunications for the home, and even control home appliances and lighting, for example. Generally speaking, however, a user was restricted to computing information available only on that computer. A game could be installed on the desktop computer and played on that computer, but one could not play others who had computers at other locations. Technology came to the rescue with a first attempt at connecting these computers utilizing telephonic modem technology. This permitted individual users to connect via direct dial-up telephone connections. This was great for local telephone calls, but enormously expensive for long distance calls. However, with the advent of the Internet, all that has changed. It provides an inexpensive means to connect computers from all over the world. This allows users to quickly and easily transmit and receive information on a global scale. Businesses fully embraced this new technology, creating "e-commerce." Now users can send and receive information and even buy products and services online. This means of accessing a wealth of information and easily processing transactions online has become a staple for our society.

It stands to reason that once people enjoy the benefits of a tool like the Internet that they would want to be able to utilize the tool wherever they go. The development of laptop computers has helped to allow a more mobile access point to the Internet. However, laptops still require some type of connection, whether by wire or wireless, to a means of connecting to the Internet. This greatly limits their flexibility for a typical user who is always "on the go." Technology has continued to respond by developing computers that require a device to be placed on the body along with large batteries and glasses that provide a viewing screen. Although much more portable, the bulkiness of these devices limit their usefulness, and the reduction in device size (over a typical desktop computer) generally limits its computing power. Additionally, because of its intricacies, it is a device that a user must choose to wear, knowing its limitations and restrictions and being careful not to damage the delicate equipment.

As society embraces new technology, it begins to demand more from it. Initial users of computing devices were thankful for the ability to alleviate repetitive tasks from their workload. They were more than happy to walk to a building housing the computing machine, so they would not have to do the repetitive tasks. Since society has grown accustomed to having computers readily available at work and home, it now demands that computing information be available everywhere. In some places, kiosks have sprung up at airports and shopping malls, so that people can easily access information. Even this has not been enough for some users who attempt to obtain the smallest and lightest computing devices that allow them access anywhere they can carry them. Such things as personal digital assistants (PDA's) and ultra miniature laptops often attempt to provide users with information while they are mobile.

Despite the diminutive size of computing devices available today, their operational concept remains generally the same as for the first invented computing device. A user "comes to" the device and asks it a question. The device then attempts to provide the user with the information. Progress has been made in "push technology" where a user pre-programs a device to retrieve desired information. However, this is time consuming and typically the programming is done assuming a user is stationary. Although a user wants the time and temperature of the city where they live when they are at home, when they travel to another city, that information becomes irrelevant to the user at that time. In an attempt to overcome this problem, technology has begun to focus on solving the problem of finding the location of a user. The most obvious choice was to utilize Global Positioning Systems or GPS. This is a military satellite location system designed to aid the military in troop movements and equipment locations. The government provided to the public a less resolute version of tracking from their satellites. Although not as accurate as the military version, it is very accurate compared to conventional means. The first civilian devices that utilized satellite tracking were bulky and hard to use. Eventually, GPS units shrunk tremendously in size and could be easily transported. Units were even developed that plugged directly into mobile computers, such as the laptop. This combination allowed users to track their progress such as on street maps displayed on their laptops while they were driving. Unfortunately, lugging a laptop, hooking up all the connections to the GPS antennae, and finding power for all the equipment, made utilizing this technology burdensome. Additionally, by the nature of its technology, GPS only works when it can directly access a minimum number of satellites, limiting its use in congested areas such as in larger cities with skyscrapers and especially when a person is indoors.

Users are gradually demanding that they have pertinent information available to them at all times without requiring a burdensome device. For example, a frequent traveler would like to have weather information, airport information, or car rental information available to them no matter where they are located. Gas stations, restaurants, and other businesses would like to reach those travelers and let them know where they are located at the right moment. This passing of information allows a user to gain more beneficial use of their time and resources despite a lack of prior knowledge of an area. A business person could also benefit by being able to quickly ascertain area resources for a new client. Providing information on an as-needed basis is the most cost-effective means of increasing business.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to location determination, and more particularly to systems for providing an approximate location of a device utilizing multiple ambient signals from emitting entities, such as, for example, base stations, towers, mobile platforms, building antennae, and the like. A monotonically increasing nature between actual signal strengths and signal strength indicators provided by technology, such as, for example, Microsoft's Smart Personal Object Technology (SPOT), is leveraged to determine a device location. This provides a locating means without a need for calibrating individual devices and/or requiring a defined measuring unit for determining location. By utilizing inferencing applied to observations of ambient signal frequencies, a means of locating a device is obtained. In one aspect of the present invention, a rank vector is utilized to insulate results from a monotonically increasing function of measured signal strength vectors. This desensitizes the present invention from needing to obtain absolute signal strengths in order to determine locations. The present invention also facilitates approximations for locating a device by providing a system that does not require obtaining a substantial number of available signals while still providing substantial accuracy in determining locations, reducing computational and data storage requirements.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 11 is a table of simulated signal strengths for radio stations in the Seattle area in accordance with an aspect of the present invention.

DETAILED DESCRIPTION OF THE INVENTION

Figure 1:
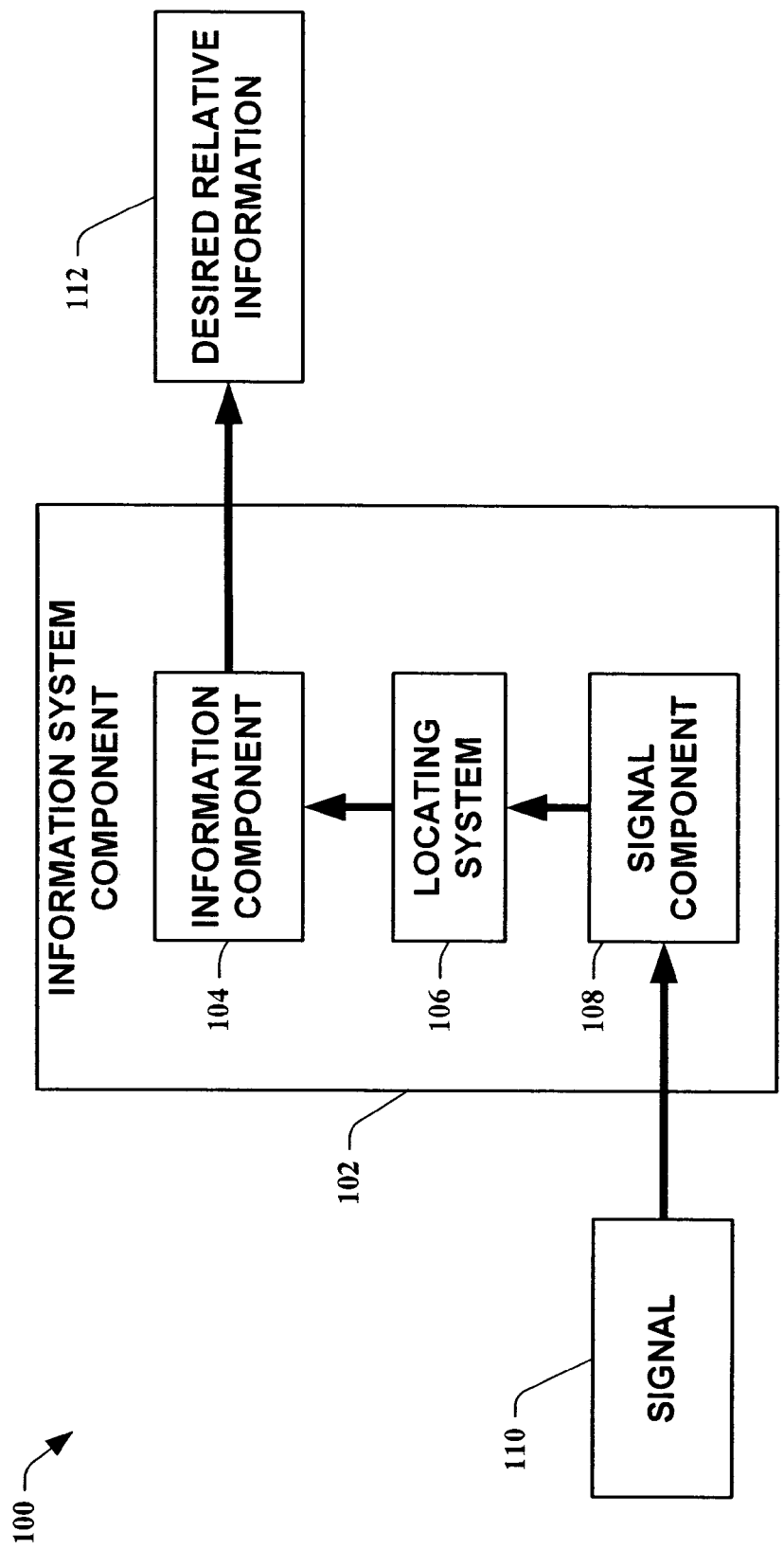
FIG. 1 is a block diagram of an information system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The present invention discloses an approach to identifying coarse location information, indoors and/or outdoors, via an analysis of ambient signals from multiple signal emitters such as, for example, commercial radio stations and the like. In one instance of the present invention, it operates with extremely small amounts of power, making it a feasible source of location information for small, low-power devices that provide a form of signal strength indication such as, for example, Microsoft's SPOT. SPOT centers on the development of a wristwatch-sized device with an ability to receive notifications via digital data encoded within regular FM radio broadcasts. A device and/or method employing the present invention enables building location-specific notification services utilizing, in one instance, the preexisting ability of SPOT devices to receive FM and to measure signal strengths. In one instance, the present invention utilizes an algorithm entitled the "RightSPOT" algorithm. The present invention is also insensitive to variations caused by manufacturing differences in the construction of devices employing the present invention.

Location awareness in portable devices allows for new mechanisms for sales and marketing. For example, users may wish to subscribe to services that provide discounts and promotions that are relevant for the location they are in or near. Retailers, such as restauranteurs, may wish to employ such location-sensitive alerts about time-limited offers to do load-balancing, so as to fill an empty restaurant given a slow evening. Location-sensitive filtering can limit promotions only to clients who are close enough to a place of business to provide such responsive load balancing while limiting the numbers of alerts by only relaying those that might be relevant during a short time frame.

In FIG. 1, a block diagram of an information system 100 in accordance with an aspect of the present invention is shown. The information system 100 is comprised of an information system component 102 having an information component 104, a locating system 106, and a signal component 108. A signal 110 is received by the signal component 108 and processed into a signal strength indicator. This processing generally requires an analog to digital process. The signal component 108 can be capable of processing various signals, such as ambient radio waves and the like, including but not limited to, frequency modulated (FM) signals. Once a signal has been converted into a signal indicator, it is passed to the locating system 106. The locating system 106 processes the signal indicators and provides a location to the information component 104. The information component 104 utilizes the location to derive a set of relevant data. The relevancy of the data can be strictly based on location and/or a combination of location and user preferences (via a user input, not shown). The data can also be related to information from downloadable lookup tables that facilitate the process. Once the data is selected, it is provided to a user as "desired relative information" 112 via a user interface, such as a graphical user interface (GUI) and/or a text-based user interface and the like.

In another instance of the present invention, the locating system 106 stores the location. This allows location data to be utilized at a later point in time such as, for example, for desensitizing location due to device orientation (e.g., averaging the last "X" number of location inferences). Tracking systems (e.g., vehicle, package, personnel, equipment tracking and the like) can also employ this type of historical location data. Thus, the present invention can be utilized, for example, to facilitate police such as in determining where a stolen object such as a car has been, or to help a package delivery service determine how a particular package was transported after a delay in delivery was found. Parents could also employ an instance of the present invention to learn where their children have been for a previous period of time. Likewise, employers can track employees and equipment to enhance performance. The present invention can also be utilized to track animals such as pets and the like. Computers can also report their locations automatically utilizing the present invention. This allows a computer to configure itself automatically based upon its location for such things as time zones, countries, and languages and the like.

In yet another instance of the present invention, a means is provided to manage limited resources based upon location. The limited resources can include, but are not limited to, memory, power, and processing capability and the like. For example, if data storage capability is limited, location can be used to discard stored data such as a map of an area that is not in the proximity of the current location of the device. This allows storage space for additional information about the present location that could not otherwise be stored. In still yet another instance of the present invention, the location information can be utilized to facilitate other entities such as hardware devices and software programs and the like. These can include, but are not limited to, navigation systems, mapping software, tracking software, and locating software and the like. Likewise, an instance of the present invention can be utilized in emergency-based devices for providing assistance in crisis situations such as medical emergencies, fires, floods, and infrastructure repair. Information such as water sources for fire control, building construction layouts, medical service locations, underground utilities, and weather reports and the like can be provided. The present invention can also be utilized to disseminate, based on location, time-sensitive information, advertising, weather reports, proximity information of an entity and the like. Proximity information of an entity can include, but is not limited to, buddy list type services for being notified when a friend or buddy is close to a device's location. Similarly, a device could also be notified when other vehicles are in the area. This information can be utilized both as a positive effect to cluster objects and/or as a negative effect to warn of objects to allow distancing or disassociation to occur.

In still yet another instance of the present invention, a means is provided to group items based on an event location rather than timing of an event. For example, if a person took photographs while on a vacation that took them to the Grand Canyon then to Las Vegas and then back to the Grand Canyon, they could have their photographs automatically sorted via location (e.g., all Grand Canyon shots together) rather than via the actual sequence in which they were taken. Since the present invention can also be utilized indoors, it can group items from indoor events as well as outdoor events. For such applications, it is often unnecessary to have detailed latitude and longitudinal coordinates, but to simply know which city or portion of a city that pictures were taken in. Such applications may even keep the coarse location implicit, and use these properties for clustering and/or grouping items into distinct sets for viewing and/or sorting.

Figure 2:
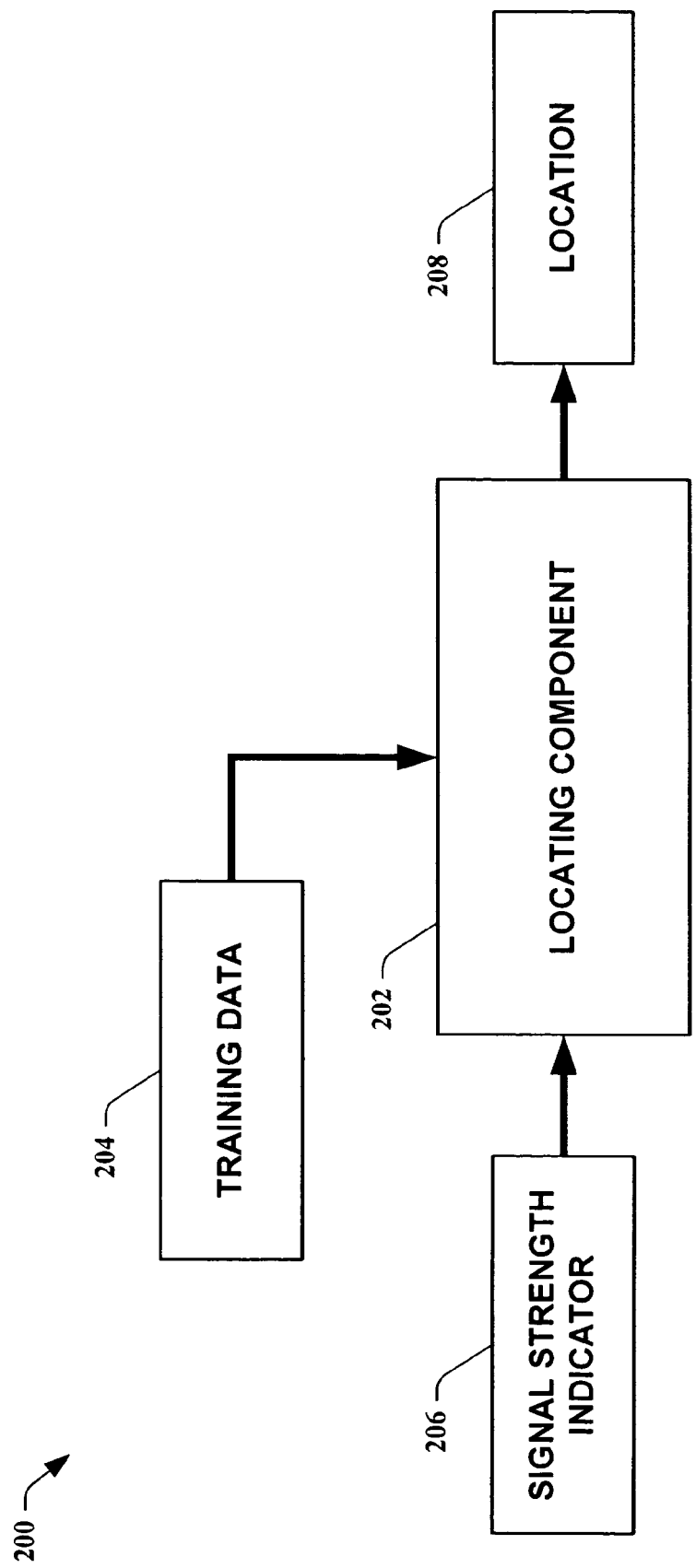
FIG. 2 is a block diagram of a location system in accordance with an aspect of the present invention.

Referring to FIG. 2, a block diagram of a location system 200 in accordance with an aspect of the present invention is illustrated. The location system 200 is comprised of a locating component 202. The locating component 202 receives training data 204 utilized to train the locating component 202. The training data 204 can be comprised of hash code permutations and the like for various locality specific signals and the like. This data 204 can be calculated from information obtained via physically traveling to a location to obtain signal characteristics and/or via simulation software that provides the desired signal characteristics. In other instances of the present invention, training data is not utilized. A signal strength indicator input 206 allows the locating component 202 to determine its location based on signal strength indicators. The indicators are not required to be absolute in terms of actual signal strength. The locating component 202 processes the signal strength input 206 in a desensitized means with regard to absolute value to provide a location 208. The locating component 202 is generally comprised of an analysis component (not shown) that computes a rank vector which provides a means to rank signal strength indicators without regard to absolute values.

Figure 3:
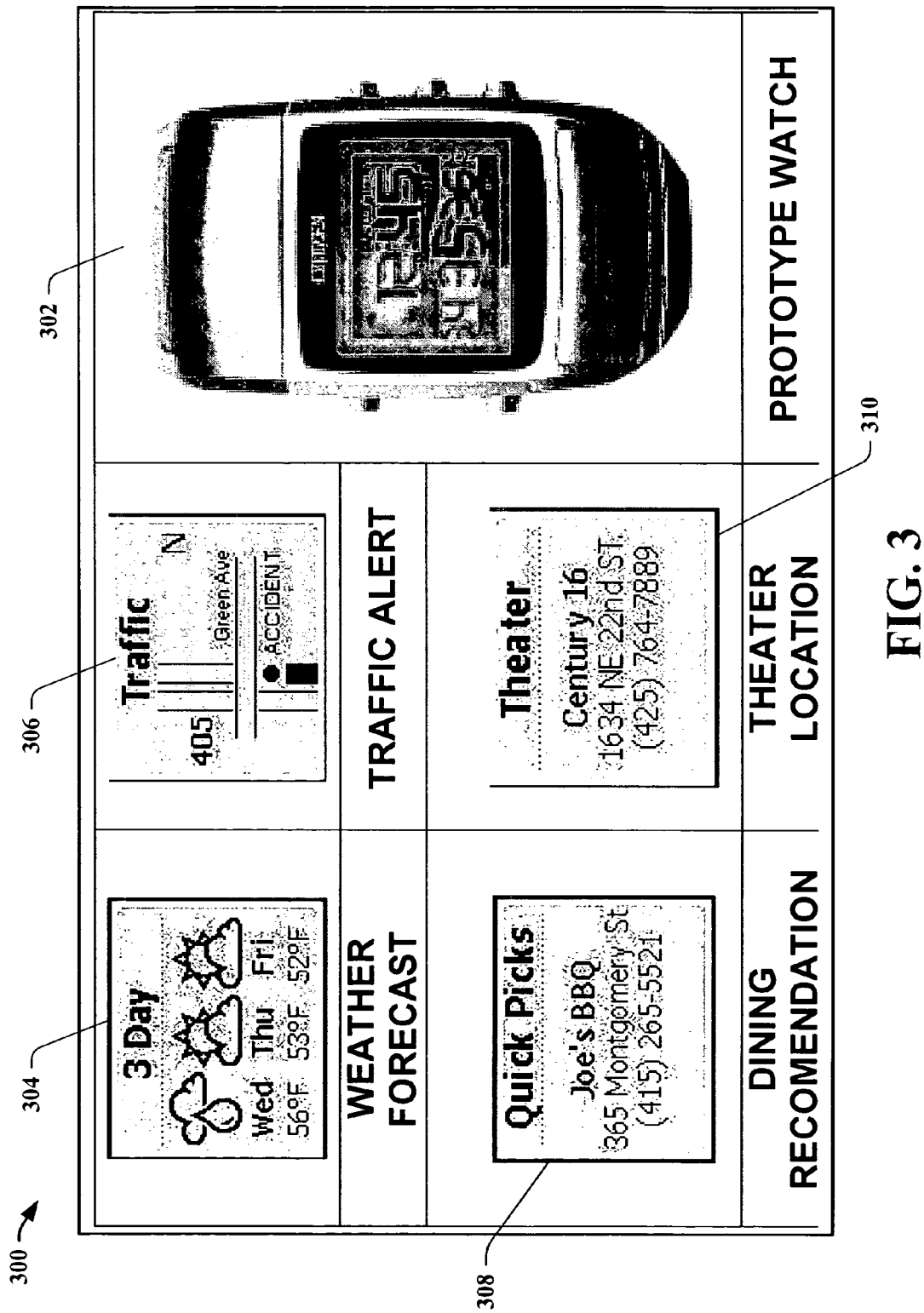
FIG. 3 is an illustration of a device employing a location system in accordance with an aspect of the present invention.

Turning to FIG. 3, an illustration of a SPOT device 300 is shown. The SPOT device 300 includes a wearable device 302, a weather forecast display 304, a traffic display 306, a restaurant display 308, and an entertainment display 310. One of the promises of ubiquitous computing is to connect users to important information as they move around in the world. One instance of the present invention leverages the small, low-power device platform of SPOT devices. SPOT provides users a means to receive critical notifications on a wristwatch-sized device as depicted in FIG. 3. The SPOT device is designed to listen for digitally encoded data such as news stories, weather forecasts, personal messages, traffic updates, and retail directories and the like transmitted on standard FM radio carrier frequencies, on bandwidth that is specially leased from the host radio stations. The device has the potential for connecting millions of people to valuable notifications and alerts.

Beyond the small-size form factor, a feature of the SPOT device is long battery life of the kind associated with digital watches, maximizing the time between charges. Thus, the SPOT device is constructed to minimize size and power consumption. The present invention is utilized, in one instance, to provide an extremely low-power method for identifying the location of devices such as, for example, SPOT devices. Since a SPOT device, utilizing the present invention, can determine location information, it supports new kinds of experiences, such as allowing the device to listen only for alerts that are relevant to particular locations. Previous basic methods for localizing data for transmission to particular devices relied on the limited range of FM radio signals. Thus, only devices within range of a particular radio tower received data relevant to that tower's coverage area. However, for certain messages, this location resolution is too coarse. Traffic updates, limited time discount offers, and lists of nearby attractions need finer location filtering than that provided by FM radio station coverage areas. Although GPS is a candidate for providing more precise location information, a GPS receiver would consume precious battery power and add volume and expense to an already densely packed device. Additionally, GPS is limited to outside usage where a direct link to satellites can be established.

In one instance of the present invention, a means is provided for localizing a device based on an analysis of ambient signal strengths from existing signal frequency emitters such as, for example, FM radio stations. Systems and methods of the present invention which employ algorithms such as "RightSPOT," can build on the SPOT technology that has already been developed for receiving notifications, including hardware and software for measuring signal strength on arbitrary frequencies in the FM band.

The present invention, in one instance, utilizes a vector of radio signal strengths taken from different frequencies to identify location. Each time a location is to be inferred, the device scans through a set of FM frequencies and records the signal strength of each one. A standard SPOT device scans through multiple FM radio stations and measures signal strength in order to find a sufficiently powerful one transmitting SPOT data. In one instance of the present invention, a Received Signal Strength Indicator (RSSI) of SPOT is provided by an analogue-to-digital converter (ADC) in the device to the present invention. Raw digital measurements for each frequency are scaled and then averaged, for example, over 20 readings for 13 milliseconds. The ADC and associated circuitry are generally not calibrated to measure RSSI in any certain units or to be consistent from device to device. One skilled in the art can appreciate that although the above example utilizes SPOT technology, such as RSSI, other means for obtaining a signal strength indicator are compatible with the present invention. The present invention can utilize any signal strength indicator, whether with units or without units, that provides relative signal strengths.

Figure 4:
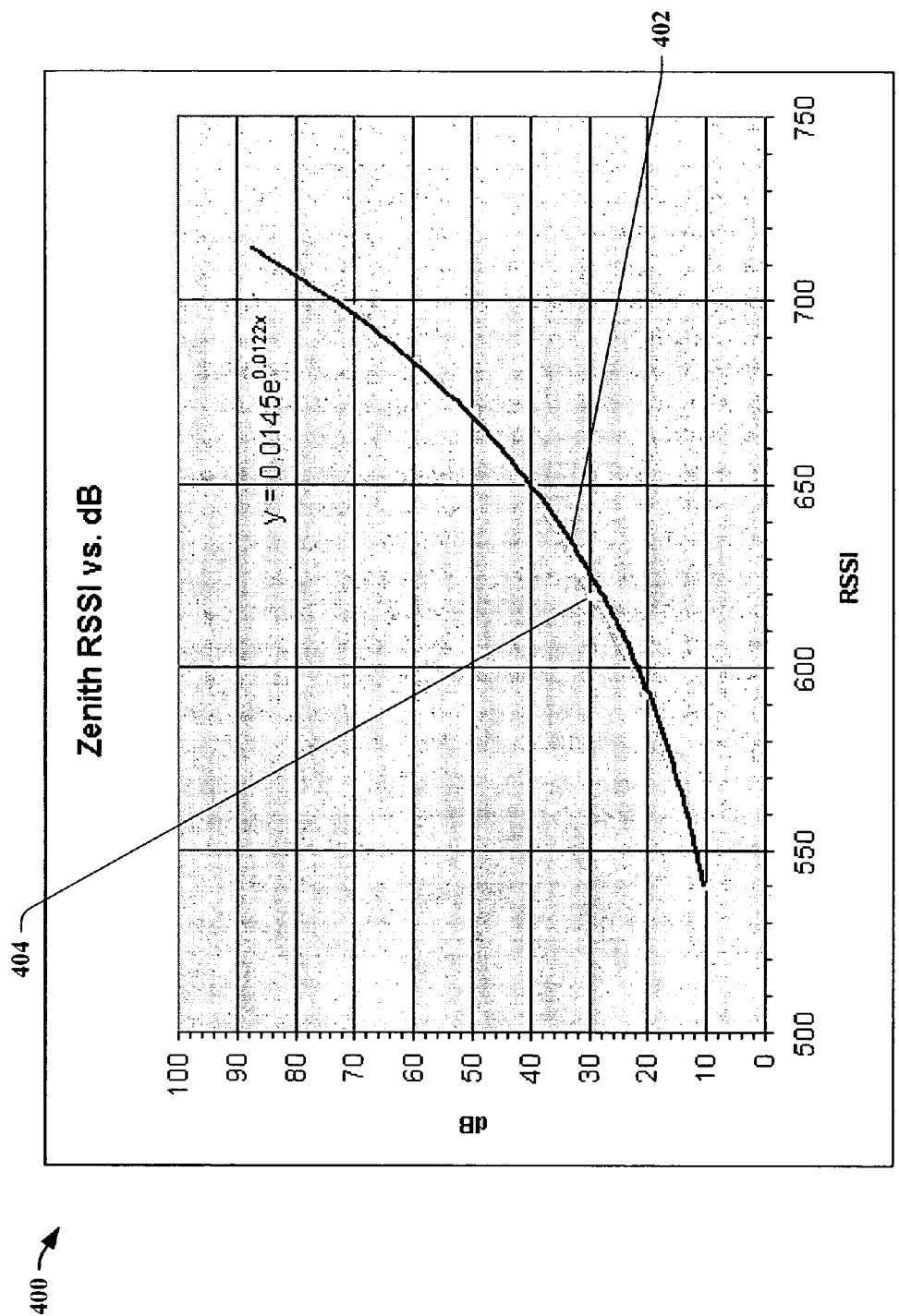
FIG. 4 is a graph illustrating accuracy of signal strengths in accordance with an aspect of the present invention.

In FIG. 4, a graph 400 illustrating signal strengths in accordance with an aspect of the present invention is shown. The vertical axis represents an input signal strength, and the horizontal axis is the measured signal strength (RSSI) from a device such as, for example, a SPOT device that provides RSSI. The curve 402 represents a fitted mathematical function to the measured data points represented by small triangles 404. The expected inconsistency among devices for measures of RSSI provides an obstacle as such variations make difficult attempts to generalize for reuse a single mapping between signal strengths and locations. One possible solution to this problem is to specially calibrate each device a priori using a source of known FM transmission strengths. The result of one of these tests is shown in FIG. 4, showing how the RSSI readings of a particular device vary with a known transmitted signal strength. The data for this test was taken in a Faraday cage, but the procedure was deemed too costly for mass production. Another solution is to train each device at different locations, gathering signal strength vectors in known places to be used in the same device later. Regular consumers would likely not tolerate such a training regimen.

In addition to manufacturing variations, signal strengths are also affected by the device's orientation, its surroundings, and the adjustment of an attaching means, such as a wrist band and the like, which can also serve as a signal receiving antenna. It would be nearly impossible to anticipate all these variable factors affecting absolute signal strength. If absolute signal strengths can be anticipated, a probabilistic framework like that of Roos, T., P. Myllymaki, and H. Tirri, in *A Statistical Modeling Approach to Location Estimation*; IEEE Transactions on Mobile Computing, 2002; 1(1): p. 59-69 would be appropriate. However, given the impracticality of discovering each device's response characteristics, an alternative method of comparing signal strengths is needed.

Figure 5:
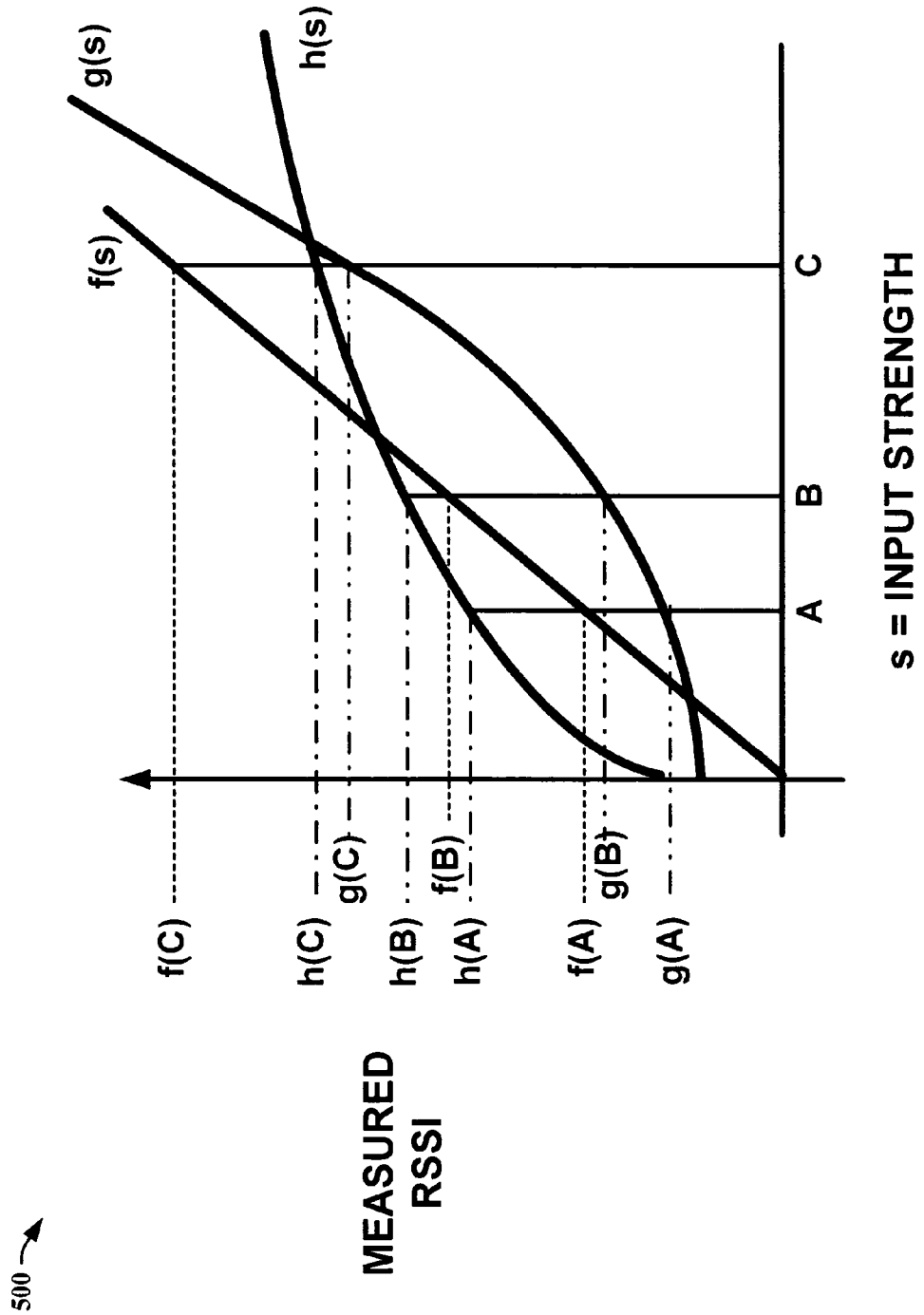
FIG. 5 is a graph illustrating monotonicity of signal strengths in accordance with an aspect of the present invention.

Rather than depend on absolute signal strength as an indicator of position, the present invention employs transformations of signal strengths that provide more robust inferences. In general tests, devices employing the present invention, such as, for example, the RightSPOT algorithm, gave results of a ranking of a set of radio stations by their measured RSSI as described infra. Ultimately, the devices could not be depended upon to give consistent absolute signal strengths. Due to this fact, an alternate assumption is utilized based on the fact that relative signal strengths are relatively consistent (i.e., an ordered list of radio stations sorted by signal strength does not vary greatly for a given location). More precisely, it is assumed that a relationship between input signal strength and measured RSSI is monotonically increasing. In FIG. 5, a graph 500 illustrating monotonicity of signal strengths in accordance with an aspect of the present invention is shown. The graph 500 shows that if a mobile device's measured RSSI is a monotonically increasing function of input signal strength, a signal strength order of inputs is also preserved. For instance, if A<B<C, these values transformed through differing RSSI-measuring functions are maintained in a substantially similar signal strength order. This allows the present invention to operate with a wide variety of devices in spite of device-to-device variations in how they measure signal strengths.

The present invention, in one instance, employs an algorithm that infers a location of a device by scanning a list of n radio frequencies (such as FM radio frequencies and the like), $f=(f_1, f_2, \ldots, f_n)$ resulting in a corresponding vector of measured signal strengths, $s=(s_1, s_2, \ldots, s_n)$. A sort routine is then utilized to compute a rank vector of the signal strengths, $v=(r_1, r_2, \ldots, r_n)$ in ascending order, where each $r_i$ gives the rank of the corresponding $s_i$ in s. For example, if a signal strength vector is $s=(12,40,38,10)$, a corresponding rank vector is $v=(2,4,3,1)$. It should be noted that the rank vector is insensitive to any monotonically increasing function of the elements of s, which makes the algorithm robust to variations in how different devices measure signal strength. Thus, the present invention does not require absolute signal strength to determine location of a device.

As a further example, the radio frequencies can represent different radio stations which can be identified by an index [1 ... n]. Measuring RSSI of each station results in a set of ordered pairs giving a station index and signal strength of each radio station: $\{(1,s_1),(2,s_2),(n,s_n)\}$. This set of radio station strength tuples is then sorted by signal strength to get a rank vector. For example, suppose n=3 and scan results are $\{(1,40),(2,30),(3,35)\}$. Sorting this set of ordered pairs on signal strength gives $\{(2,30),(3,3),(1,40)\}$. A rank vector is then the radio station indices taken in signal strength order, i.e., $v=(2,3,1)$, indicating that $s_2<s_3<s_1$. Equal signal strengths can be resolved, for example, by arbitrarily sorting, first detected sorting, most frequently detected sorting, and the like.

For n radio stations, there are n! possible rank vectors, which are permutations of integers $1,2, \ldots, n$. Each rank vector can be mapped to an integer $r \in \{0,1, \ldots, n!-1\}$ using a mixed-radix representation of the integers as described by Knuth, D.; *Seminumerical Algorithms; in The Art of Computer Programming;* 1981; Addison-Wesley: Reading, Massachusetts; p. 64 (Algorithm P). Thus, a unique hash code is generated for each permutation of signal strengths.

The present invention's classification scheme is motivated by an assumption that different locations will show different relative signal strengths. Ideally, each location would map to a single, unique value of r. In reality, due to noise, derived from such factors as a local tilt and position of a receiving unit, such as, for example, a SPOT antenna, changes in relative paths to ambient signal emitters based on different configurations and geometries associated with buildings and geographical terrain, each location produces a distribution of different r's.

It is to be appreciated that classification in accordance with various aspects of the present invention can employ a probabilistic and/or statistical-based analysis (e.g., factoring into the analysis utilities and costs) to prognose or infer an action that a user desires to be automatically performed. A classifier can be a function that maps an input attribute vector, $x=(x_1, x_2, x_3, \ldots, x_n)$, to a confidence that the input belongs to a class-that is, $f(x)=confidence(class)$. For example, a support vector machine (SVM) classifier can be employed—an SVM generally operates by finding a dynamically changing hypersurface in the space of possible inputs. Other directed and undirected models classification approaches include, e.g., naïve Bayes, Bayesian networks, decision trees, and probabilistic classification models providing different patterns of independence can be employed. Classification as used herein also is inclusive of statistical regression that is utilized to develop models of priority.

Figure 6:
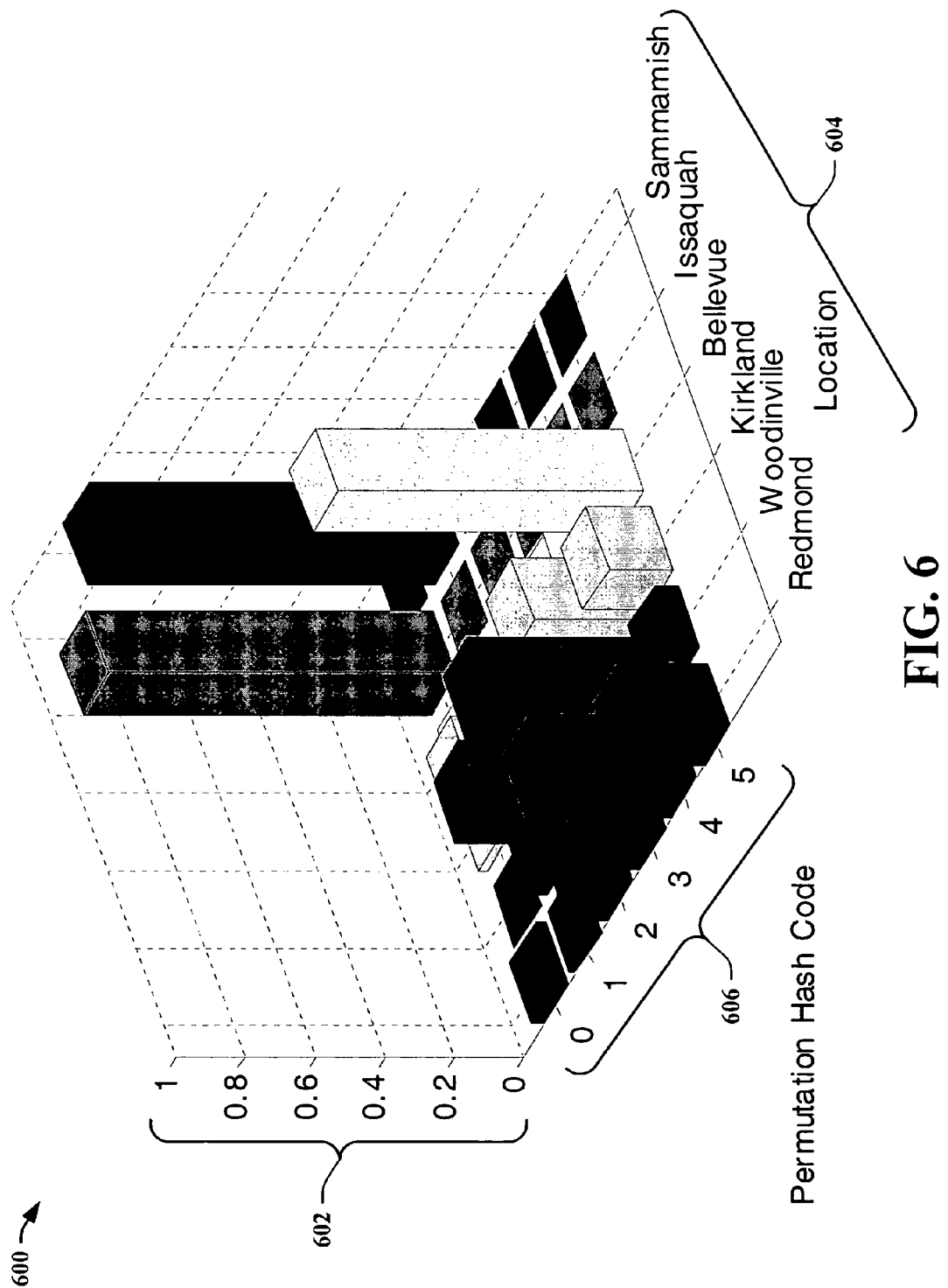
FIG. 6 is a three-dimensional graph illustrating hash code permutations in accordance with an aspect of the present invention.

Turning to FIG. 6, a three-dimensional graph 600 illustrating hash code permutations in accordance with an aspect of the present invention is depicted. The graph 600 is comprised of a normalized histogram axis 602, a location axis 604, and a derived permutation hash code axis 606. In one instance of the present invention, for example, for training a system, a receiving device, such as, for example, a SPOT device, is brought to each of L locations, gathering hash codes $r_i^{(l)}$, where $l=1,2, \ldots, L$ indexes over the locations and $i=1, 2, \ldots, N_l$ indexes over the hash codes observed at location l. For each location, a normalized histogram of the hash codes is constructed to approximate a discrete probability distribution of hash codes seen at that point, $p(r|l)$. An example of these normalized histograms for six locations and three frequencies is shown in FIG. 6.

Given observation likelihoods $p(r|l)$, and an observation $R^*$, a probability of being in any of the L locations is computed using Bayes rule:

$$p(l\mid r^*) = \frac{p(r^*\mid l)p(l)}{\sum_{l'=1}^{L} p(r^*\mid l')p(l')} \quad (1)$$

Here p(l) is an a priori probability of being at location l. Since no specific prior knowledge of the device's location exists, a uniform distribution is assumed, setting p(l)=1/L. Rather than compute likelihoods, non-normalized posteriors are directly compared. A classifier, such as, for example, a Bayes classifier, identifies a class with a maximum a posteriori probability, i.e.:

$$l^* = \underset{l=1...L}{\operatorname{argmax}} p(l\mid r^*) = \underset{l=1...L}{\operatorname{argmax}} p(r^* \mid l) \quad (2)$$

Algorithmically, this means that for an observation r*, a normalized histogram is consulted (e.g., FIG. 6), looking up values of p(r*|l) over a full range of locations l∈{1,2, ..., L}, and taking a location l with a largest value of p(r*|l).

As an example of employing one instance of the present invention, the following test is described. Three SPOT watches were selected at random from a laboratory's store of test devices. No effort was made to choose watches that gave consistent signal strengths, and no effort was made to calibrate the watches with respect to an absolute signal source or with respect to each other. This simulates a typical production run of such devices, considering the economic infeasibility of performing testing to calibrate the devices.

Figure 7:
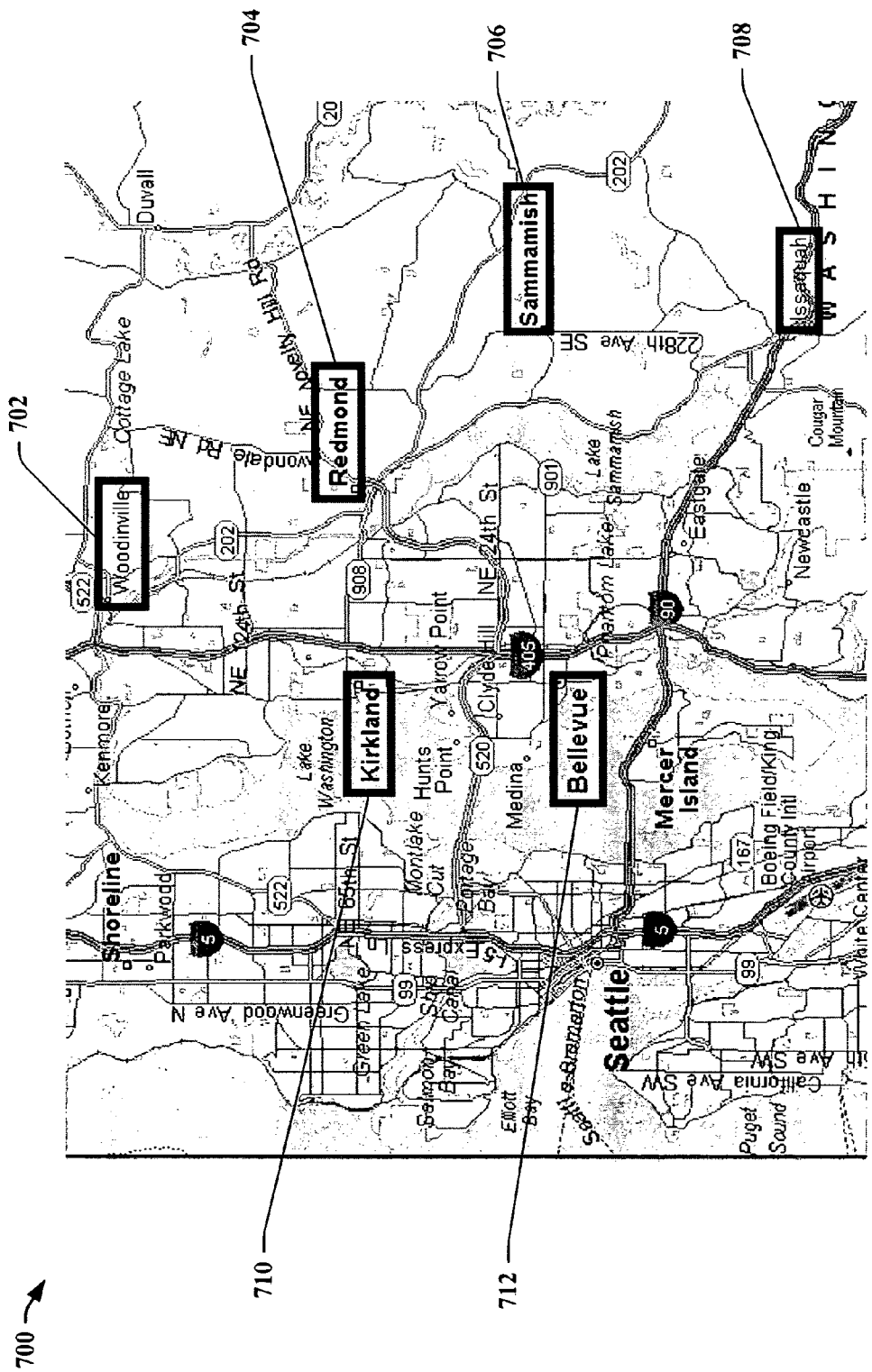
FIG. 7 is an illustration of a map utilized in accordance with an aspect of the present invention.

Referring to FIG. 7, an illustration of a map 700 utilized in accordance with an aspect of the present invention is shown. The map 700 is comprised of six locations 702-712 representing suburbs of Seattle. Each device was programmed to measure signal strengths of 32 different local FM radio stations. The devices were then transported to six different suburbs in the Seattle area, logging all 32 signal strengths, taking one measure of each station per second. In each suburb, an average of about 720 readings were taken (~10 minutes) while moving around the suburb's retail core. The retail core was selected as compelling applications for one instance of the present invention involve, for example, retail businesses sending out time-sensitive offers and listing of local attractions.

Figure 8:
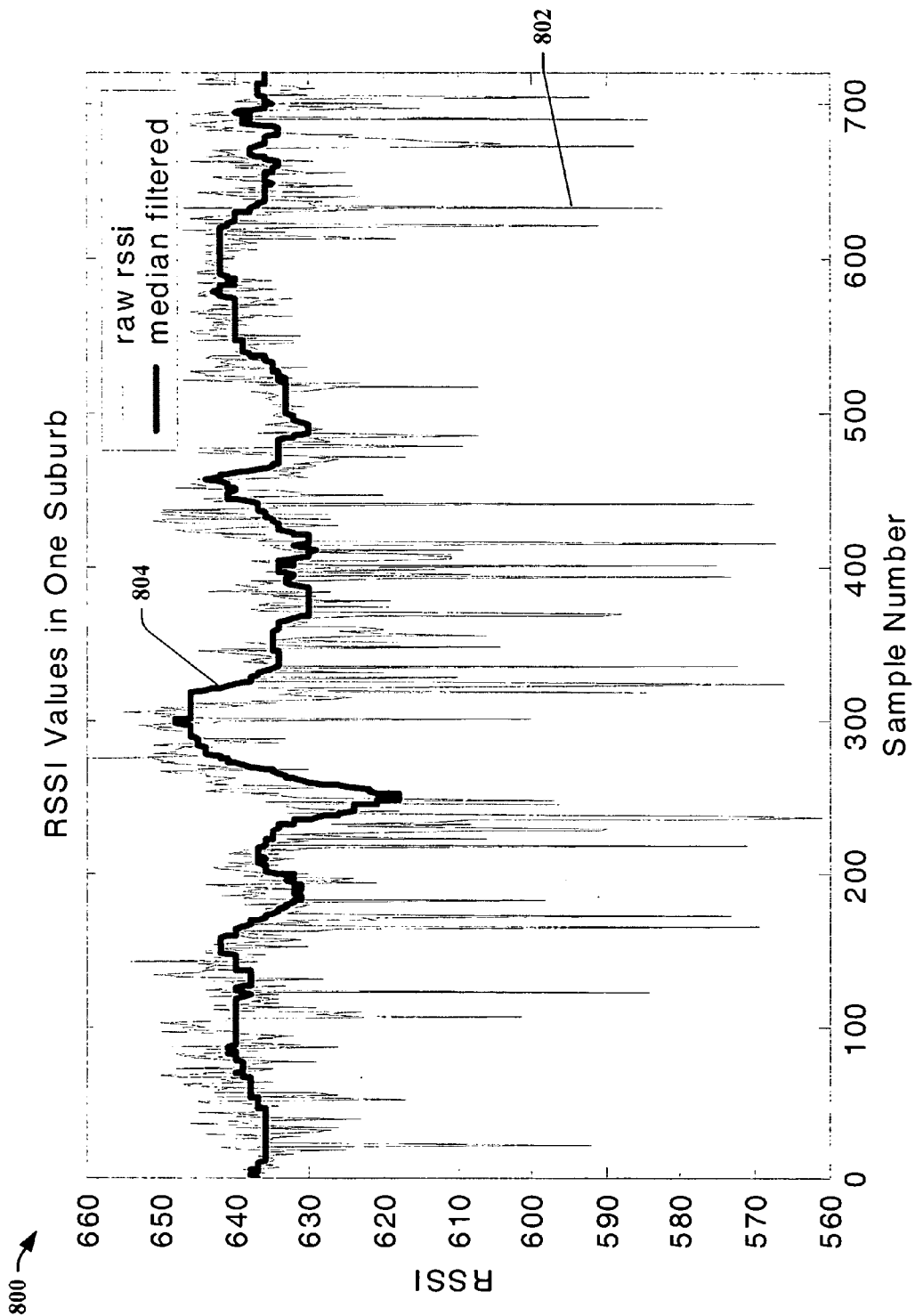
FIG. 8 is a graph illustrating radio signal strength indicator values in accordance with an aspect of the present invention.

In FIG. 8, a graph 800 illustrating radio signal strength indicator values in accordance with an aspect of the present invention is depicted. The graph 800 is comprised of raw RSSI data 802 and median filtered data 804. Raw RSSI data from the devices was found to be noisy, as shown in FIG. 8, so a windowed median filter was applied to the data, replacing each RSSI with a median of itself and a preceding 29 unfiltered values. One skilled in the art can appreciate that other filtering means can be implemented in place of the windowed median filter.

Testing was done by alternately picking data from one of the three devices as the basis for normalized histograms and testing with data from the other two. This was a more realistic test than merely testing each device against itself, because ultimately the devices, in one instance of the present invention, depend on one pre-programmed set of histograms for determining their location.

Figure 9:
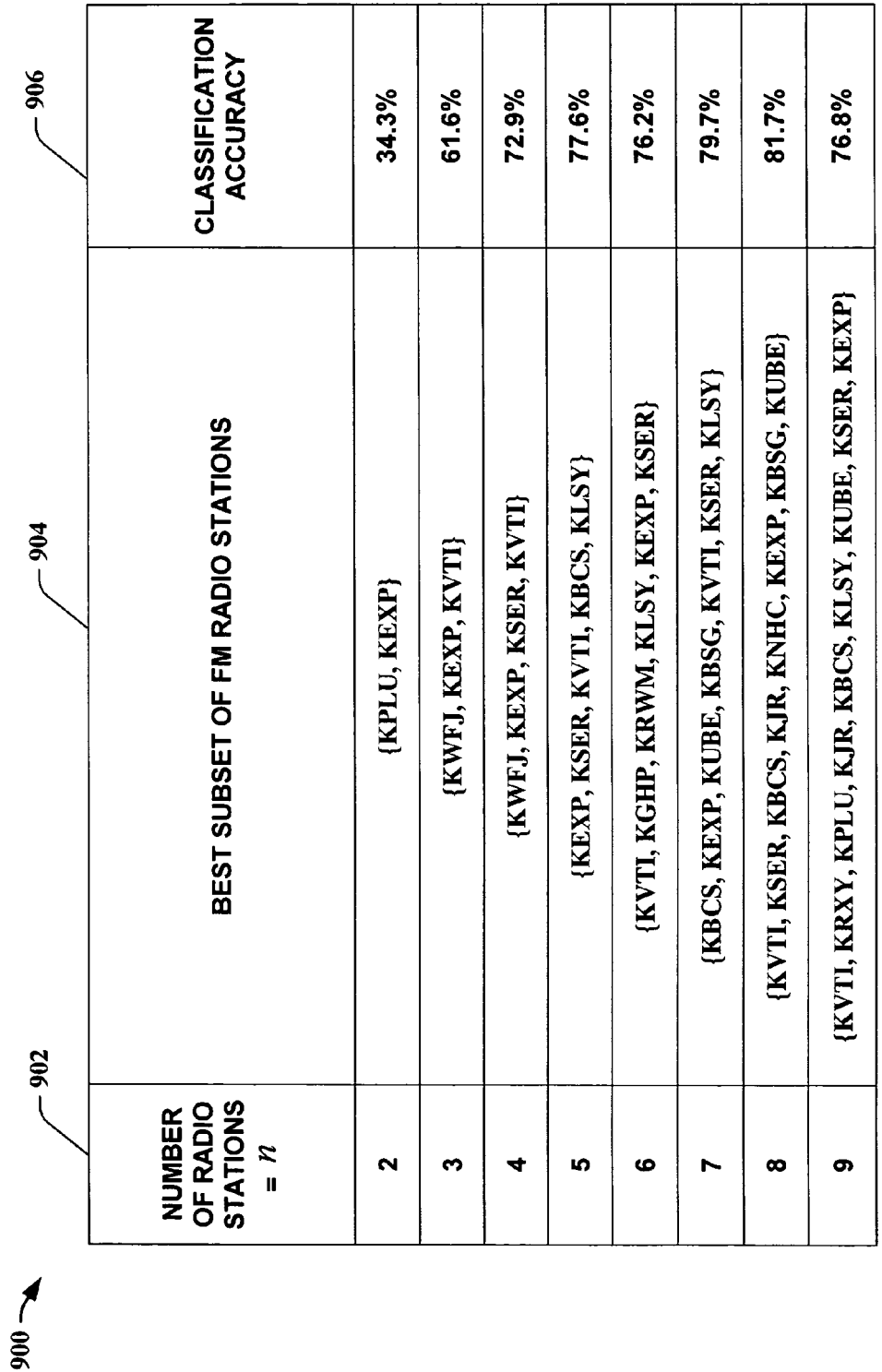
FIG. 9 is an example of classification accuracies in accordance with an aspect of the present invention.

Turning to FIG. 9, an example 900 of classification accuracies in accordance with an aspect of the present invention is illustrated. The example 900 is comprised of an ambient signal emitter quantity 902, a subset of ambient signal emitters 904, and a classification accuracy result 906. This shows how often the device was correctly classified into one of the six suburbs used for testing. In an effort to minimize the storage and computational burden of location determination, experimentation was accomplished, such as, for example, using a much reduced subset of the 32 recorded radio stations. For each test of n radio stations, a set of $$\binom{32}{n}$$

different combinations of stations to use for classifying location were examined. The results, in terms of classification accuracy, are shown in FIG. 9. Thus, the present invention can be utilized with fewer ambient signal emitters and still be utilized to locate a device.

The reported accuracy is the fraction of correct inferences made over all tests where one device was held out for making histograms and the other two used for testing. For n≤5 all possible combinations can be exhaustively tested. For n>5 a random subset of 10,000 combinations was tested. This explains why the classify accuracy goes down when moving from n=5 to n=6 stations; it is likely that a best combination via the simulation-based selection of a random subset for n=6 was not found. The best classification accuracy is 81.7% using n=8 radio stations. It should be noted that this level of location accuracy exploitation was done in an opportunistic manner utilizing ambient signal emitters (e.g., radio transmitters and the like) and utilizing receivers that were not intended for providing location information.

This example demonstrates the feasibility of using existing ambient signal emitters, such as, for example, FM radio signals, to localize a device down to a suburb utilizing one instance of the present invention. By employing existing technology, such as, for example, SPOT devices, with the present invention, existing hardware can be leveraged to measure signal strengths, such as, for example, FM radio signal strengths, so that the capability for localization, in one instance of the present invention, only requires the addition of a small amount of software to an existing configuration. Different devices measure signal strengths differently, and signal strengths are also affected by many other variables. The present invention employing, for example, a Bayesian classification algorithm, does not utilize absolute signal strengths, but instead utilizes a ranking of signal strengths to facilitate in ensuring robustness across devices and other variables.

Obviously, to infer a location from a rank hash code, there needs to be a relationship between location and hash codes. One way to ascertain this relationship, as described supra, is to physically visit locations on the ground and record signal strengths. However, for general utilization, this is tedious and requires maintenance work if a radio station changes its transmitter's power and/or location. Thus, the present invention can also be employed to anticipate signal strength characteristics of different locations without actually visiting them to obtain signal characteristics or "training data." Rather than make a large number of physical measurements, RadioSoft's ComStudy software (see generally, Internet website http://www.radiosoft.com) and the like is utilized to generate simulated FM radio signal strength maps. Such a simulation can also facilitate in determining a good subset of radio stations to listen to for best localization. Methodologies for optimal usage of radio strength maps, includes the harnessing of probabilistic methods to learn how the reliability and potential biases of simulations varies from actual received data based on such features as topology, geometric relationships between topology and/or transmitters, and the presence of buildings and other man-made structures. For example, we can train statistical classifiers for reliability and/or bias based on a collection of data about the differences in simulated radio strengths and actual detected radio strengths and harness such classifiers to develop confidences and/or corrections in radio map tables and radio strength ordering functions.

Also, notions of persistence of location can be utilized to fill in gaps in confidence that may show up. For example, if a device is not confident in a particular location, assume that device is closest to a location last sensed with confidence if the time is not great enough to allow for distant travel.

The ComStudy software supports many radio propagation models that can be utilized to predict FM radio maps. The Longley-Rice model (see, P. L. Rice, A. G. Longley, K. A. Norton, and Barsis, A. P.; *Transmission Loss Predictionsfor Tropospheric Communication Circuits*; National Bureau of Standards Technical Note 101, January, 1967) was chosen in this example of an instance of the present invention, for its known accuracy. It is generally the most accurate of the choices since it incorporates reflection, refraction (bending of the rays as they rise through the atmosphere), and several types of diffraction (spilling of signal over hills). The model utilizes a terrain map to simulate the effect of hills and valleys.

ComStudy parameterizes each radio station transmitter by its frequency, transmitting power, and location (latitude, longitude). For each transmitter, a field strength matrix is generated. The matrix is a grid of rectangular cells spread over a chosen area on the ground, with each cell containing signal level information from a transmitter in question. The width of the cells was chosen to be 6 arc seconds (about 185 meters north-south and 124 meters east-west). This is equivalent to having 40 points (cells) per square kilometer. ComStudy then applies a chosen propagation model to calculate field strength in the center of each cell. In this example, maps were generated for 28 local FM radio stations in the Seattle, Wash. area.

Before utilizing simulated signal strength maps for location inference, a determination was made as to the confidence level that the maps accurately predicted rank vectors. To accomplish this, a SPOT watch was programmed to measure signal strengths of the same 28 FM radio stations for the generated maps. The SPOT watch was then transported around the area, logging the signal strengths of all 28 stations, taking one 28-station scan per second, resulting in about 3920 readings for each station. Latitude and longitude was also logged from a GPS receiver. To assess accuracy of the simulation, a Spearman rank correlation (see, William H. Press, Saul A. Teukolsky, William T. Vetterling, and Brian P. Flannery; *Numerical Recipes in C;* 1992, Cambridge Press) was calculated between the ranked radio stations from the measured signal strengths and from the simulated signal strengths, utilizing the GPS readings to determine which simulated strengths to use from the maps. The Spearman rank correlation was utilized instead of Kendall's because differences between data values ranked further apart are given more weight with Spearman. Both correlations range over [−1 . . . 1], with "1" indicating equivalent rankings and "−1" indicating opposite rankings.

Figure 10:
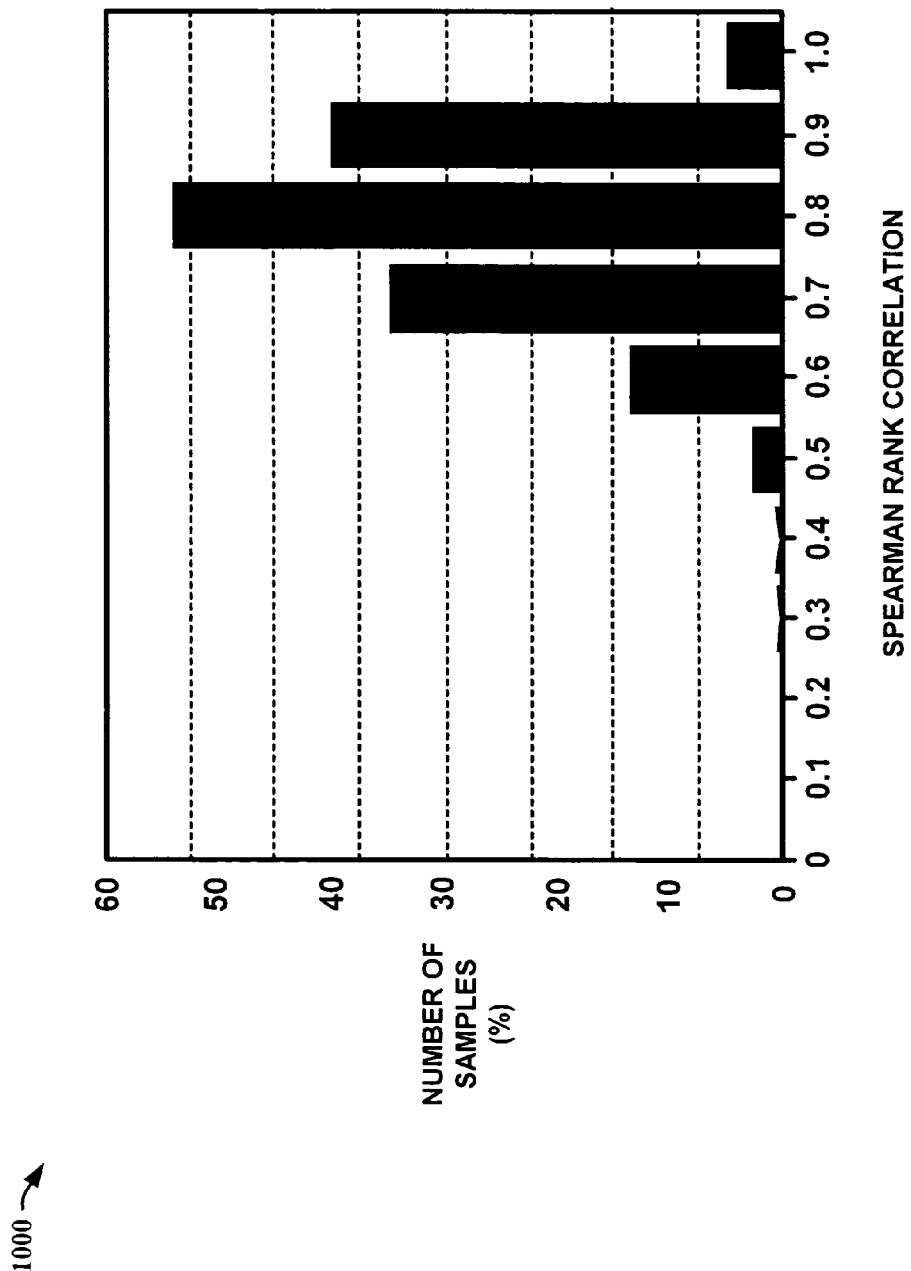
FIG. 10 is a histogram of Spearman's correlations between measured signal strength and simulated signal strength in accordance with an aspect of the present invention.

In FIG. 10, a histogram 1000 of Spearman's correlations between measured signal strength and simulated signal strength in accordance with an aspect of the present invention is depicted. The histogram 1000 shows that more than 95% of the measured rankings were correlated with the simulated rankings with a factor of at least 0.6 on a scale of [−1 . . . 1]. This indicates that the simulated results are sufficiently accurate for determining a location of a SPOT watch. Even better correlation is obtainable if the number of stations is reduced as discussed in more detail infra.

With 28 available radio stations, $28! \approx 3.05 \times 10^{29}$ different rank vectors are provided, which demands a huge computational and storage overhead. However, many of those stations are broadcast from the same tower with some having similar transmission power. Measuring signal strengths from co-located, similarly powered stations is redundant. To eliminate these redundancies, the 28 stations are divided into groups of approximately similar stations. The following criteria are then utilized to assess similarity:

1. Calculate Pearson's correlation coefficient (see, id) between all pairs of stations based on spatially corresponding points on simulated signal strength maps. (Note: Pearson's correlation coefficient is a standard linear correlation coefficient, not a rank correlation.)
2. Find groups of stations that are correlated with each other greater than a certain threshold $\rho$. For this example of an instance of the present invention, $\rho=0.95$ is utilized.
3. From each correlated group, select a station with a highest average signal strength to represent a group.

Applying the above criteria to the simulated signal strength of the Seattle area (the criteria was also applied to actual measurements from a SPOT watch and resulted in approximately the same results with $\tau=0.9$.), it was found that there are seven groups of correlated stations with Pearson's correlation factor of at least 0.95. In FIG. 11, a table 1100 of simulated signal strengths for radio stations in the Seattle area in accordance with an aspect of the present invention is depicted. The table 1100 shows seven groups of stations along with frequencies, means, and variances of correlated stations inside each group. Selected stations from each group are shown with bold-faced type.

Figure 12:
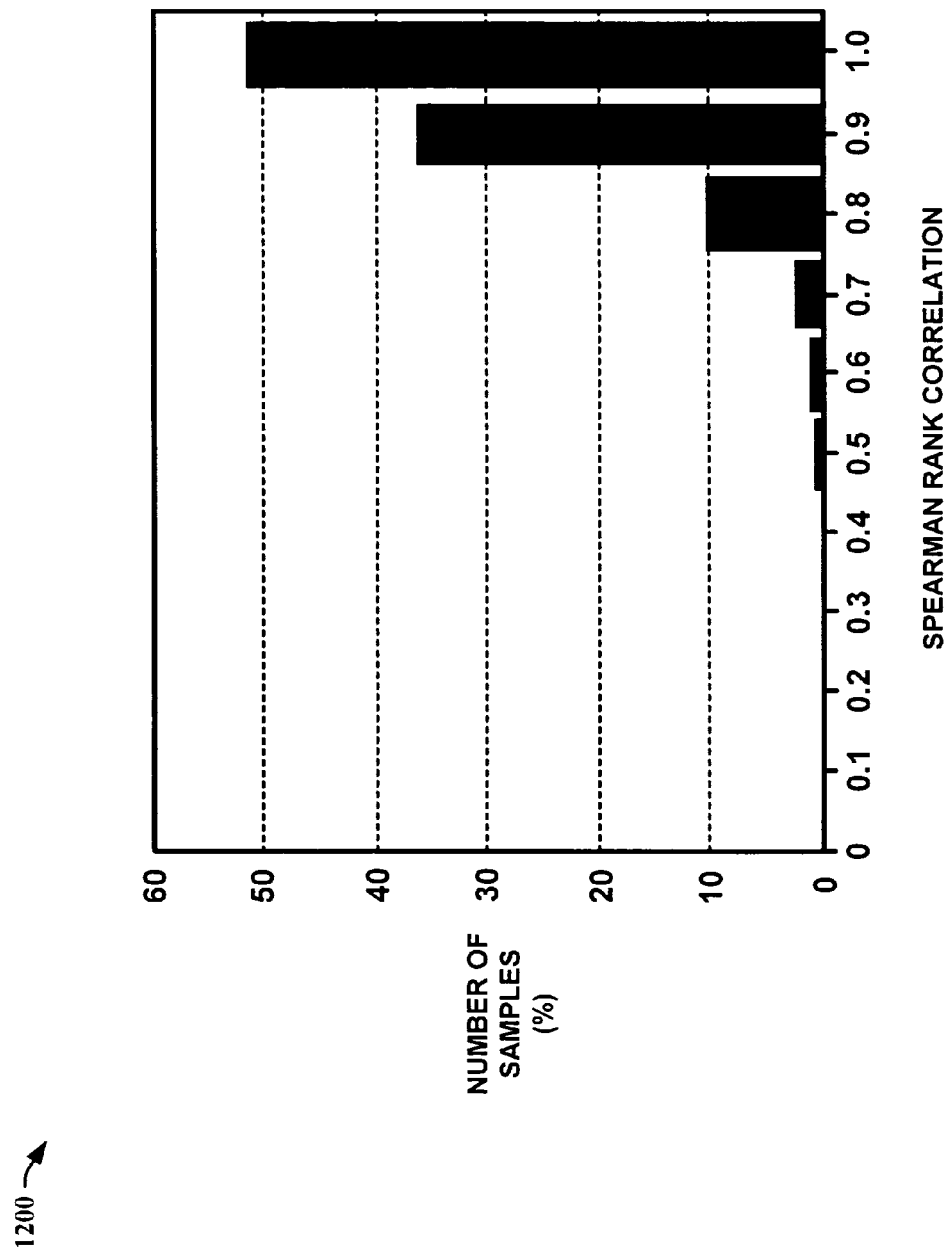
FIG. 12 is a histogram of Spearman's correlations between measured signal strength and simulated signal strength of seven chosen stations in accordance with an aspect of the present invention.

Applying the above criteria, the number of stations is reduced from 28 to 7. This means instead of having 28! different ranking vectors, there are just 7!=5040 ranking vectors, a reduction of 25 orders of magnitude. This has a significantly positive effect on computational and memory performance for techniques utilized for location determination. This is particularly important for resource-limited devices. In FIG. 12, a histogram 1200 of Spearman's correlations between measured signal strength and simulated signal strength of seven chosen stations in accordance with an aspect of the present invention is illustrated. The histogram 1200 shows a significant improvement over the similar histogram 1000 with 28 stations (FIG. 10), with an even higher correlation between measured and simulated signal strengths. More than 95% of the measured signal strength rank vectors are correlated with the simulated signal strength with a factor of 0.8 or above. This further emphasizes that the simulated results are valid to employ for determining a location of a SPOT watch and similar devices and the like.

Each cell of the simulated signal strength maps is converted to a rank hash code, which is ultimately utilized for inferring location from measured rank hash codes. The simulated signal strength maps are generated on a grid with cells about 124 meters wide (east-west) and 185 meters high (north-south). This is near the limit of the ComStudy's maximum simulation resolution, and it is much finer than required for this example of the present invention. Furthermore, this fine resolution provides 442,806 cells (811 east-west by 546 north-south) to represent a test area around Seattle. The rank hash code ranges over [0 . . . 7!−1], meaning that each fine cell needs a 13-bit integer to represent its hash code. The radio map would then need 811×546×13/8≈0.7 MB to represent the fine grid of hash codes for the test area. Generally speaking, this is too large for small, resource-limited devices.

To alleviate this storage problem and to represent hash codes at a reasonable resolution, a coarse grid is created over a fine grid and each coarse cell is represented as a histogram of rank hash codes from its underlying fine cells. The size of the coarse cells was varied, but a typical size is 3 km×3 km which covers 16×24=384 fine cells. Each coarse cell's histogram is normalized to give an estimate of a probability distribution of rank hash codes for a cell. Mathematically, this likelihood estimate is $P'(r|c_i)$, where $r \in [0 \ldots n!-1]$ represents a rank hash code of n radio stations and $c_i$, $i \in [0 \ldots m]$, represents one of m coarse cells.

In practice, the histograms are sparsely populated because of a large number of possible rank hash codes. Due to noise, orientation of a device, and unsimulated radio propagation effects, rank hash codes in a cell is often measured for which a simulated likelihood $P'(r|c_i)$ is zero. Thus, a likelihood estimate is smoothed to fill in gaps. Unfortunately, simple smoothing over rank hash codes r is not reasonable, since adjacent hash codes do not necessarily represent similar rank vectors. Instead, smoothing is accomplished by replacing a value in each histogram bin by a maximum value over all bins whose Spearman correlation coefficient with a bin in question is above a chosen threshold $\rho_s$. In equation form, the (unnormalized) smoothed likelihood is computed as:

$$P_u(r|c) = \max_{r':S(r,r') \geq \rho_s} P'(r'|c) \quad (3)$$

Here S(r, r'), is a Spearman correlation coefficient between rank vectors represented by hash codes r and r'. $P_u(r|c_i)$ is then normalized over r into $P(r|c_i)$ to give a smoothed likelihood function of a rank hash code given a coarse cell. Intuitively, $\rho_s$ serves as a smoothing parameter, with higher values giving more smoothing.

Given a measured rank hash code r, the probability of being in a cell $c_k$ is given by Bayes rule:

$$P(c_k|r) = \frac{P(r|c_k)P(c_k)}{\sum_{i=1}^{m} P(r|c_i)P(c_i)} \quad (4)$$

Given r, this denominator is constant, and no a priori assumptions are made on which of the m cells a device is in, meaning $P(c_k)=1/m$. Thus, a maximum likelihood estimate is selected as a location of the device:

$$c = \underset{c_k:k \in [1 \ldots m]}{\operatorname{argmax}} P(r|c_k) \quad (5)$$

In actual practice, these results are smoothed by taking a most frequently inferred cell over a last K signal strength scans (temporal window size). This helps keep a location inference from jumping unreasonably from place to place, although an excessive value of K can cause the inference to be too "sticky."

Figure 13:
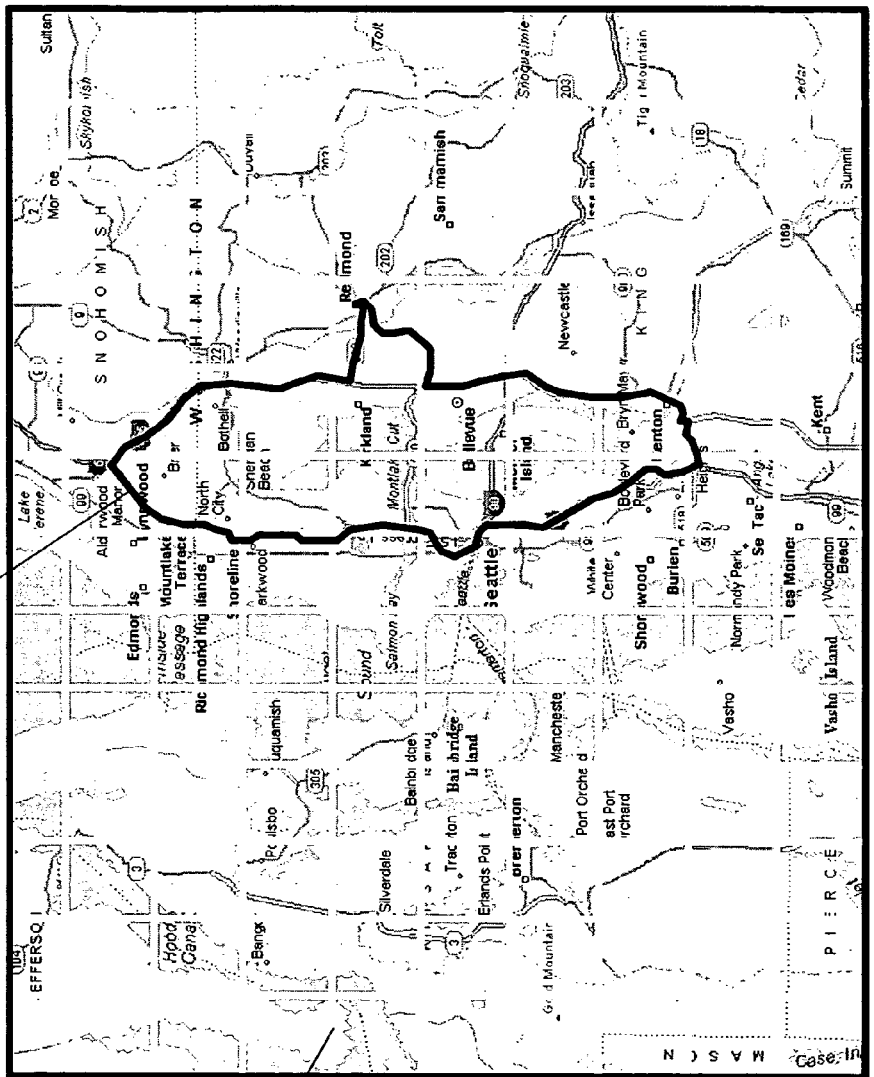
FIG. 13 is a map illustrating a test area in accordance with an aspect of the present invention.

The supra example was performed in the greater Seattle area with a SPOT watch programmed to measure signal strengths of a reduced set of 7 local FM radio stations. The SPOT watch was transported around the area, logging signal strengths of all 7 stations, taking one 7-station scan per second, resulting in about 3920 readings for each station along with GPS location readings. Meanwhile, a simulated radio map for the 7 stations was generated. In FIG. 13, a map 1300 illustrating a test area in accordance with an aspect of the present invention is depicted. The map 1300 shows a drive path 1302 along with a coarse grid 1304 with cell width 7 km that was used for inferring a location. The drive path 1302 included both highways and local roads.

The example illustrates that a device's location can be determined with the present invention down to an accuracy of less than 10 miles (~16 kilometers), utilizing simple histograms built on top of a simulated radio map. Following is a discussion on effect of correlation threshold $\rho_s$, temporal window size K, and grid cell width w, on the accuracy of an estimated location.

Figure 14:
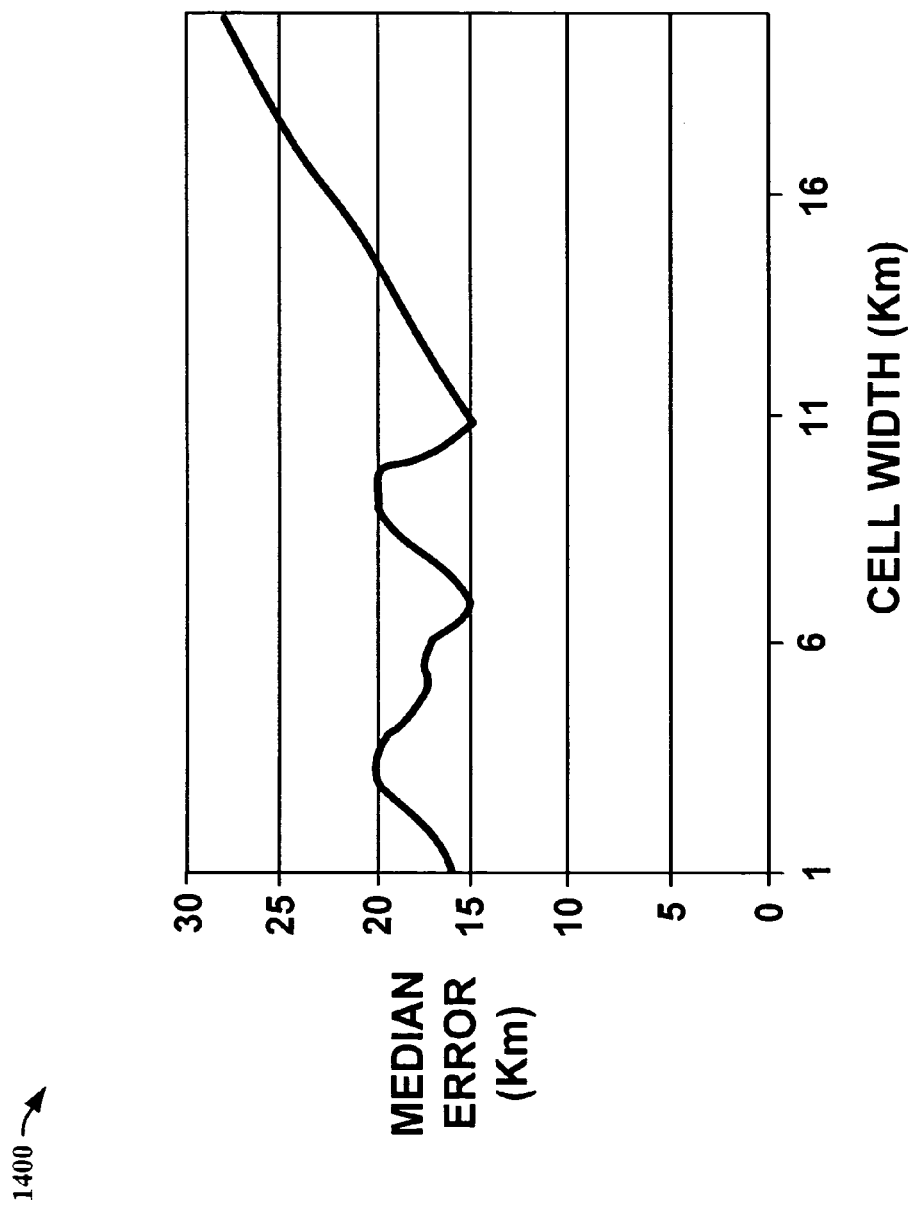
FIG. 14 is a graph illustrating a relation between cell width and median error in accordance with an aspect of the present invention.
Figure 15:
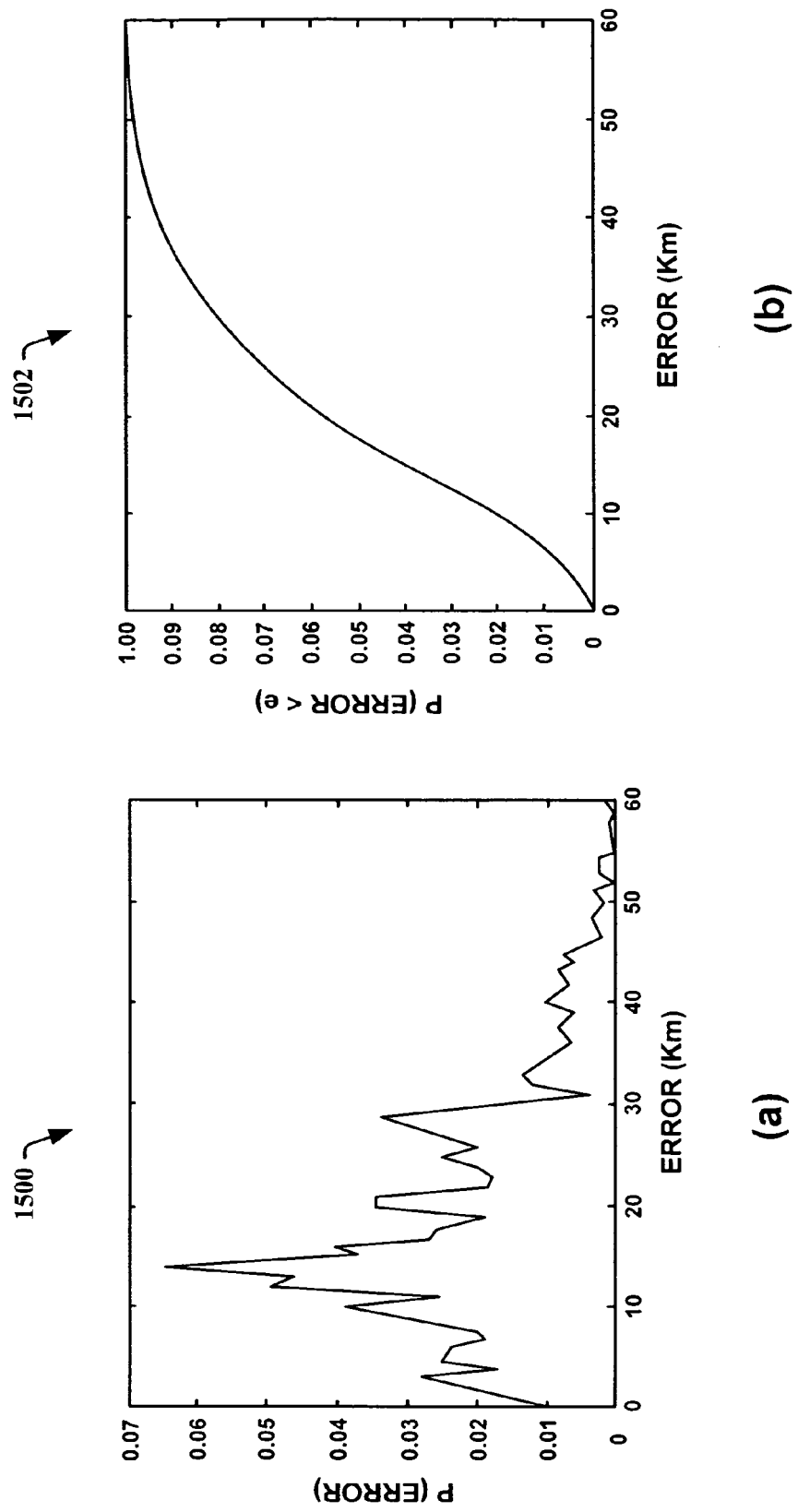
FIG. 15 is graphs illustrating probability density function and cumulative density function errors for a given cell width in accordance with an aspect of the present invention.

The example shows that a coarse grid cell width w is an important parameter in terms of affecting accuracy of a location inference. Increasing the coarse cell width has an advantage of having more fine grid cells in a histogram estimate of $P'(r|c)$ and, hence, more information about ranking probability distributions. Also, increasing a cell width decreases an overall number of cells in the grid and thus reduces computational overhead. However, as the cell width increases, location resolution naturally decreases. In FIG. 14, a graph 1400 illustrating a relation between cell width and median error, for $\rho_s=0.9$ and K=5, in accordance with an aspect of the present invention is shown. From the graph 1400, it can be seen that there are three values (1, 7, 11 kilometers) that result in a lower median error, around 10 miles (~16 kilometers). In FIG. 15, graphs 1500, 1502 illustrate probability density function and cumulative density function errors for a given cell width in accordance with an aspect of the present invention. The error probability density function (PDF) graph 1500 and cumulative density function (CDF) graph 1502 correspond to a cell width w=1 kilometer, $\rho_s=0.9$ and K=5.

Figure 16:
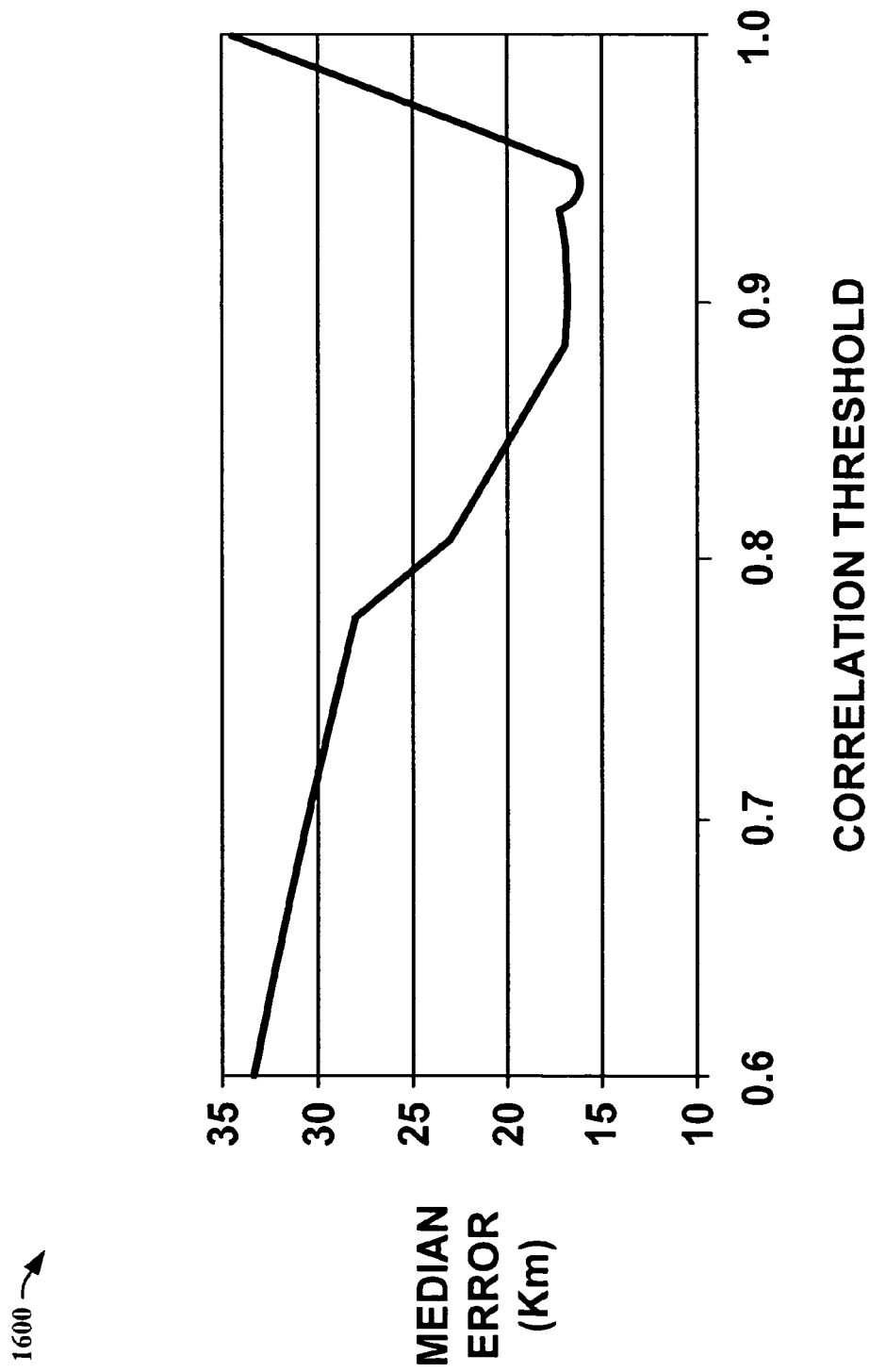
FIG. 16 is a graph illustrating a relation between correlating threshold and median error in accordance with an aspect of the present invention.

The second factor that affects accuracy of an inference algorithm is a correlation smoothing threshold $\rho_s$. As discussed in supra, the correlation threshold was introduced to smooth a likelihood estimate. Therefore, increasing $\rho_s$ will result in filling more gaps in a histogram-based estimate of $P'(r|c_i)$. However, increasing pS above a certain value will result in too much smoothing, decreasing the distinguishability of different locations. In FIG. 16, a graph 1600 illustrating a relation between correlating threshold and median error in accordance with an aspect of the present invention is depicted. The graph 1600 shows that there is a global minimum of the median error at $\rho_s=0.9$, where w=1 kilometer and K=5 (A graph interpolation anomaly is responsible for a false dip at around $\rho_s=0.95$.).

Figure 17:
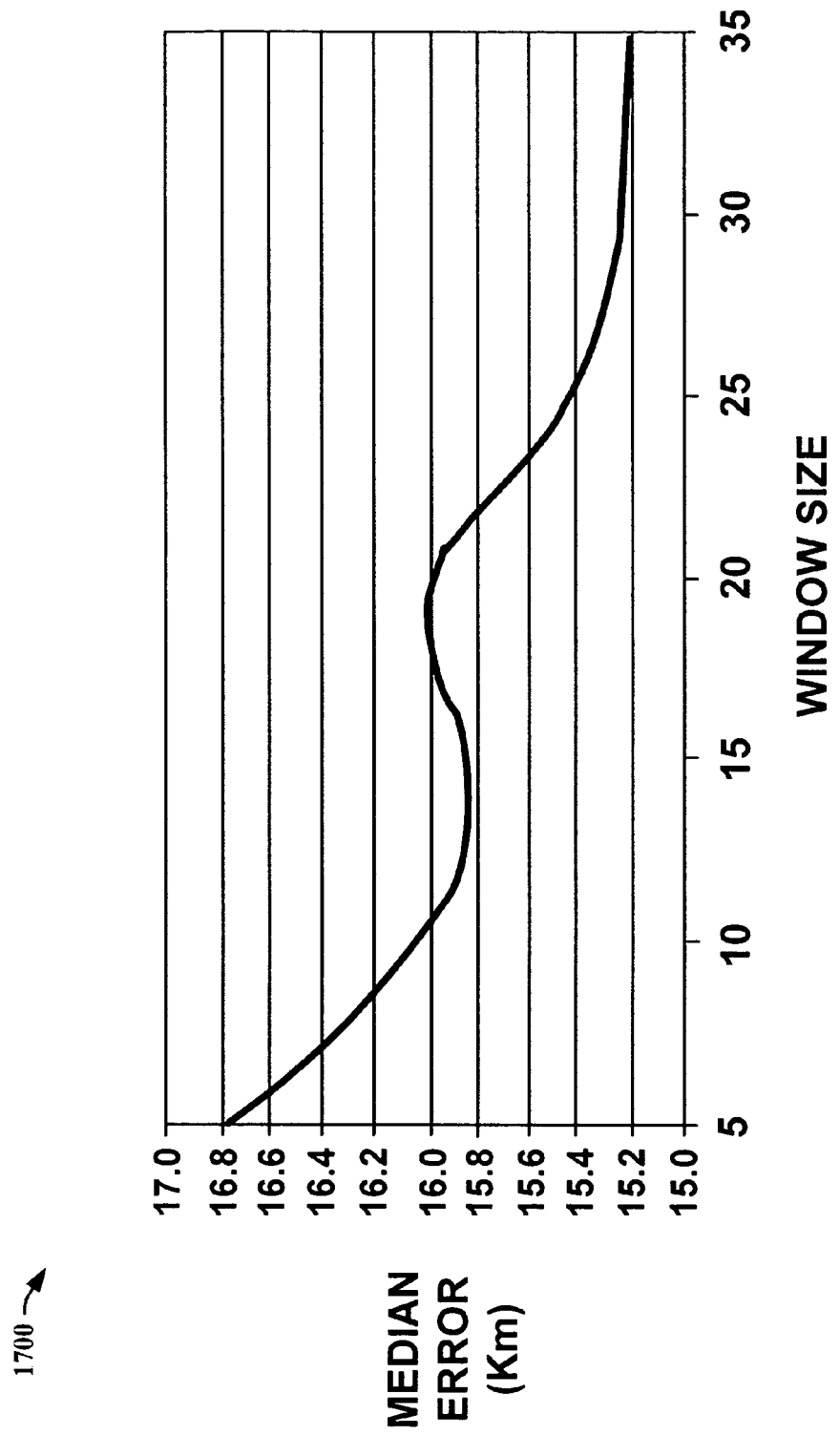
FIG. 17 is a graph illustrating a relation between window size and median error in accordance with an aspect of the present invention.

Another factor that affects accuracy is the temporal window size K. Because radio stations were scanned at 1 Hz, K corresponds to a number of seconds of data utilized to infer position. Clearly, increasing K enhances accuracy; however, it also increases memory storage and computational power requirements. In FIG. 17, a graph 1700 illustrating a relation between window size and median error in accordance with an aspect of the present invention is illustrated. It is clear from the graph 1700 that a median error of less than 10 miles (~16 kilometers) is obtained with a window size K≥10, where w=1 kilometer and $\rho_s=0.9$.

The present invention provides a means for inferring a location of a device based on ambient signal strengths such as FM radio signal strengths and the like. Its advantages include a wide coverage of FM radio, spanning indoor and outdoor locations, and the readiness of a target device such as a SPOT device and the like for measuring radio signal strengths, providing an accuracy of several miles. The present invention is robust to measurement differences between devices, relying on inferences based on rankings of ambient signals rather than on their absolute signal strengths. No manual survey of signal strength as a function of location is necessary when employing simulated signal strengths. By utilizing smoothed histograms of rank hash codes, a device's location can be inferred down to an accuracy of less than 10 miles (16 kilometers). The extremely low resource utilizing employed by the present invention allows it to provide functionality to resource limited devices such as small, wearable devices.

In yet another instance of the present invention, a method is employed to identify which radio station histograms to transmit to a device, given a limited storage capacity of certain devices. In still yet another instance of the present invention, classification accuracy can be boosted by smoothing position inferences over time, exploiting knowledge about location adjacencies, and adhering to constraints about how fast devices are expected to move between locations. Still yet another instance of the present invention employs decision-theoretic approaches to minimizing misdiagnosis given probability distributions over locations. Once again, still yet another instance of the present invention employs other fundamental representations that capture relative properties of relative signal strength beyond rank orderings, including methods that capture strength ratios and relationships among groups of signal emitters clustered by strengths.

In view of the exemplary systems shown and described above, methodologies that may be implemented in accordance with the present invention will be better appreciated with reference to the flow charts of FIGS. 18-23. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

Figure 18:
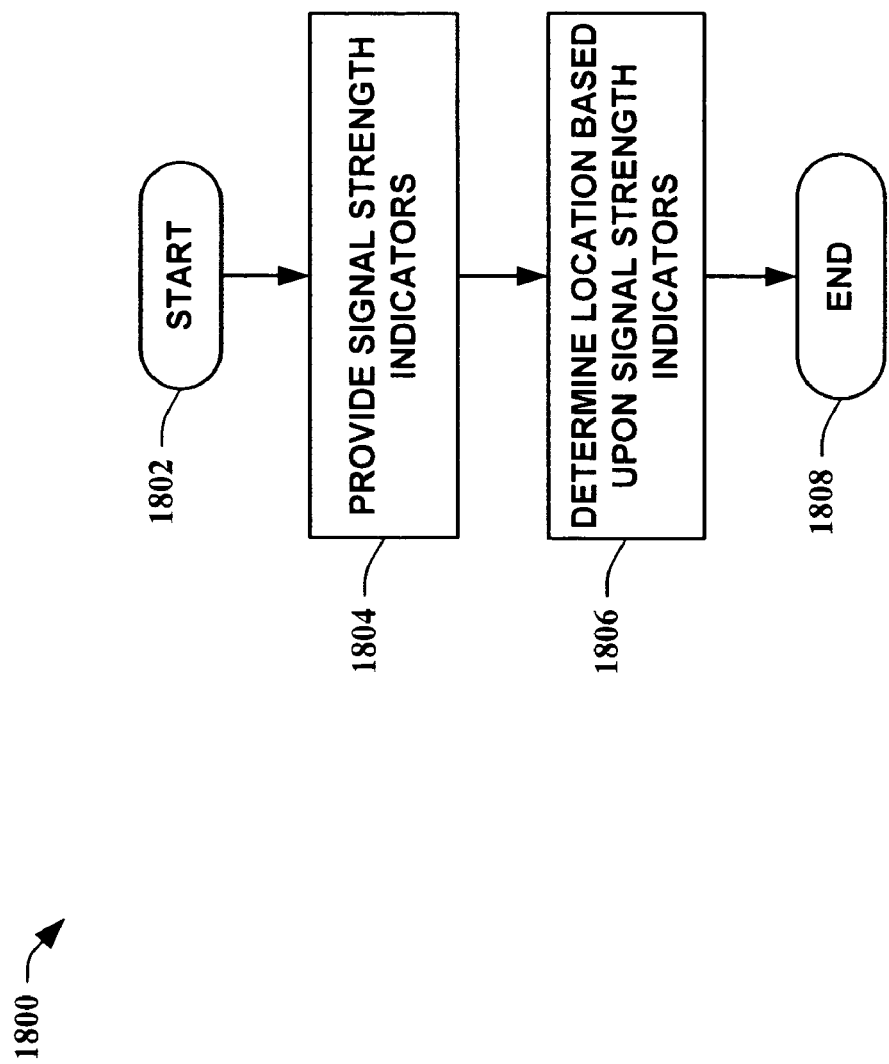
FIG. 18 is a flow diagram of a method of locating a device in accordance with an aspect of the present invention.

Turning to FIG. 18, a flow diagram of a method 1800 of locating a device in accordance with an aspect of the present invention is depicted. The method 1800 starts 1802 by providing signal strength indicators 1804. The indicators are generally representations of signals such as ambient signals and the like from signal sources such as towers, building antennae, and mobile units (including terrain and aeronautical units and the like) and the like. The signals can include, but are not limited to, frequency modulated signals, amplitude modulated signals, ultra high-frequency signals, very high-frequency signals, and the like and even more directional signals such as upper microwave signals and the like. The present invention can also be adapted to operate with higher frequency-receiving devices capable of indicating signal strengths of infrared, x-ray, and cosmic ray and the like. Similarly, lower frequency receiving devices which provide reception for ultra-sonics, sonics, and infra-sonics and the like are operable with the present invention as well. The present invention can also account for time-varying signals and signals emitted from mobile platforms. Terrain-sensitive propagation models can also be utilized to account for variations in signals due to terrain obstructions. Likewise, other propagation models can be utilized to account for such things as reflections from large structures such as buildings, monuments, and man-made objects and the like. By utilizing velocity prediction models, the present invention can also be utilized to determine the velocity of a device as well as its location.

The signal strength indicators are not limited to only those indicators that provide accurate strengths in an absolute in scale. The present invention can accept signal strength indicators without any units associated with the indicators. Once the signal strength indicators are provided, a location is determined based upon the provided signal strength indicators 1806, ending the flow 1808. The determination is generally based upon an algorithm that allows a distribution to be leveraged to provide a location through inferencing. In one aspect of the present invention, a Bayesian classification algorithm is utilized that does not rely upon absolute signal strengths. Instead, a ranking of signal strengths is employed to facilitate in ensuring that variations such as signal detection errors, calibration errors, and unknown signal strength indicator sources and the like do not impact the location determination.

Figure 19:
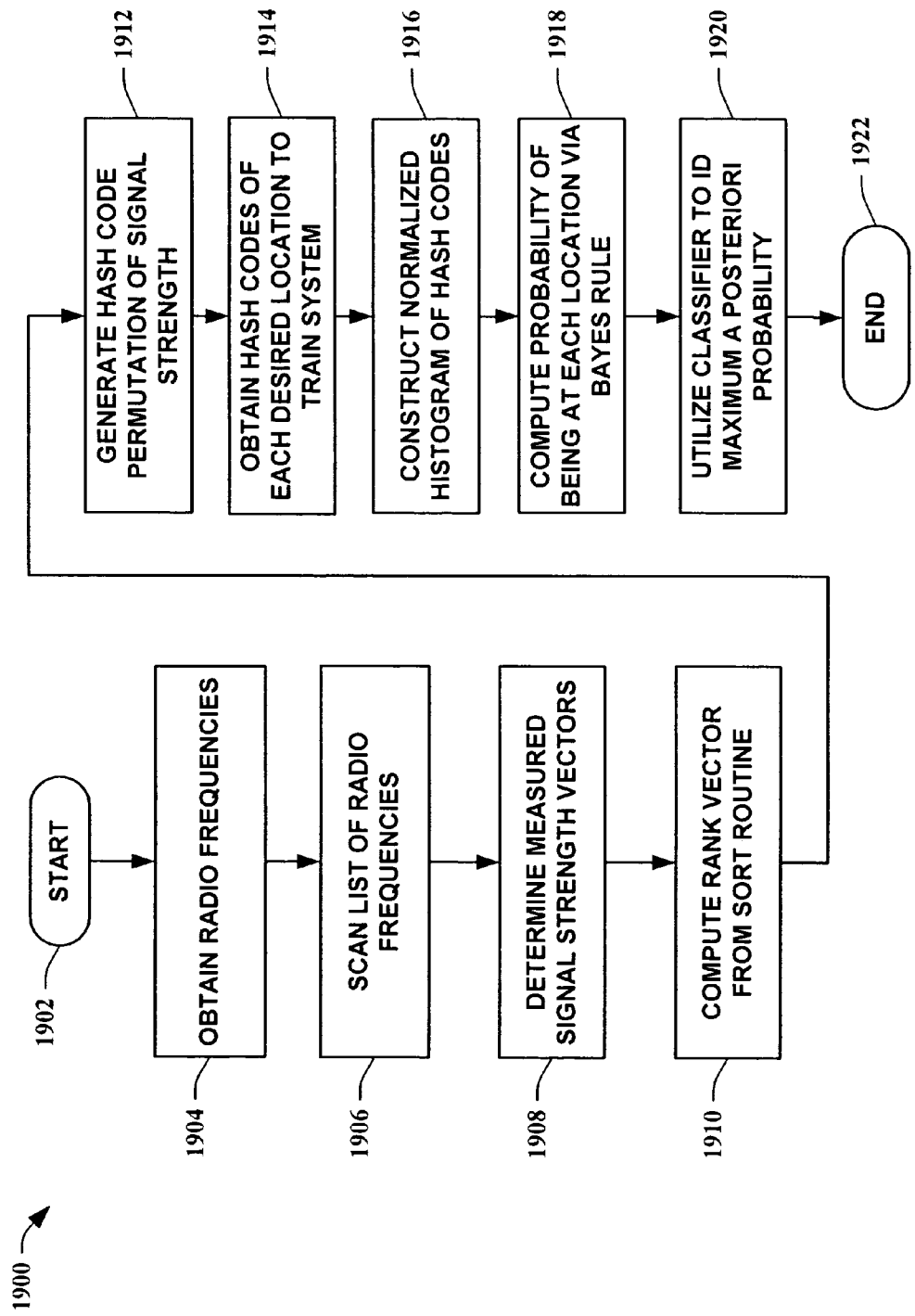
FIG. 19 is another flow diagram of a method of locating a device in accordance with an aspect of the present invention.

In FIG. 19, another flow diagram of a method 1900 of locating a device in accordance with an aspect of the present invention is shown. The method 1900 starts 1902 by obtaining ambient signals such as, for example, radio frequency signals from such sources, for example, as commercial FM radio towers and/or stations 1904. A list of the radio frequencies is then scanned 1906 and measured signal strength vectors are determined 1908. The relative strengths are then sorted and a rank vector is computed for the frequencies 1910. Hash codes are then generated based on permutations of the signal strengths 1912. Hash codes are then obtained from each desired location to train a location system 1914. Normalized histograms are then constructed from the hash codes 1916. A probability is then computed via, for example, Bayes rule 1918. A classifier, such as, for example, a Bayesian classifier, is then utilized to identify a maximum a posteriori probability, indicating that a device is most likely in that particular location 1920, ending the flow 1922.

Figure 20:
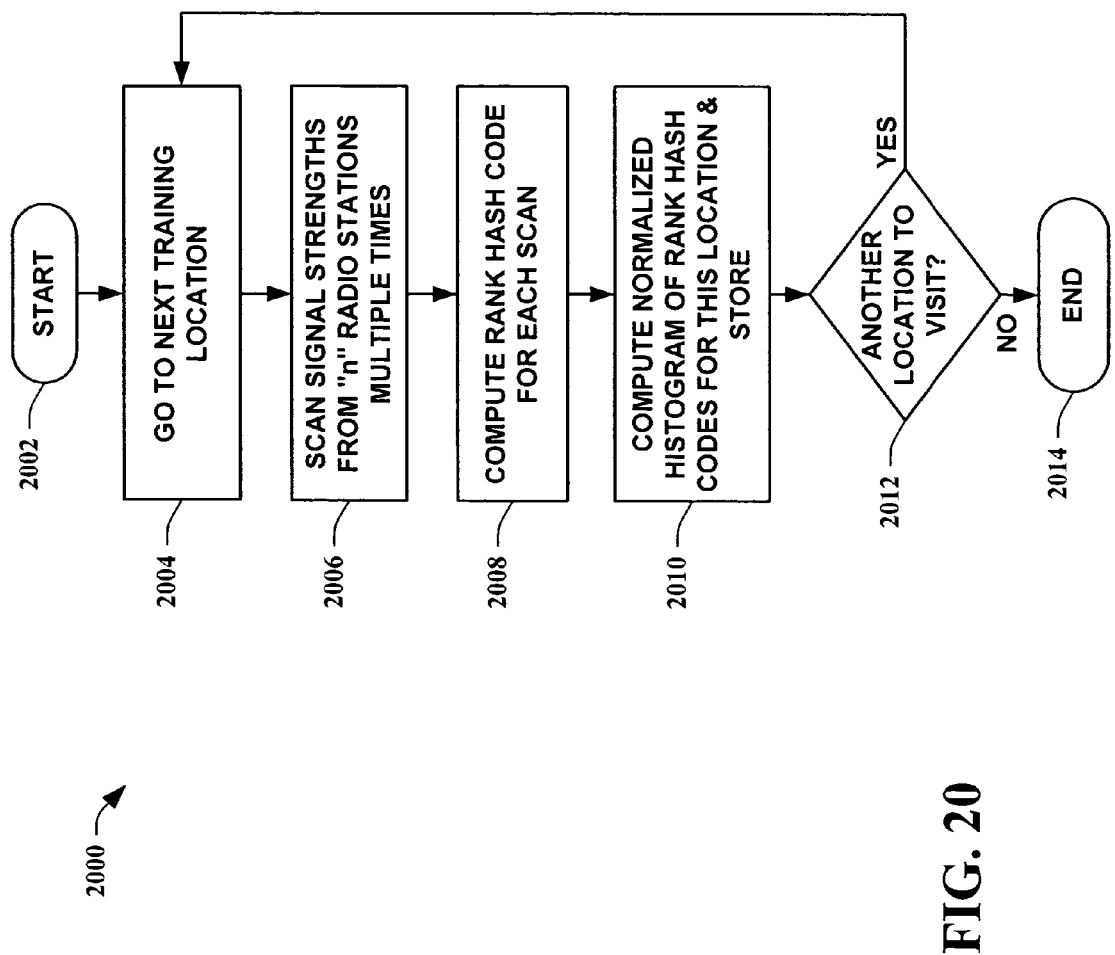
FIG. 20 is a flow diagram of a method of training a locating device in accordance with an aspect of the present invention.

Referring to FIG. 20, a flow diagram of a method 2000 of training a locating device in accordance with an aspect of the present invention is illustrated. The method 2000 starts 2002 by positioning a device that receives ambient signals in a particular location 2004. Ambient signals, such as radio frequency signals and the like, are each scanned multiple times to obtain their signal strengths 2006. Rank information, such as rank hash codes and the like, is then computed for each scan 2008. A normalized histogram of rank information, such as the rank hash codes, is generated for the particular location and stored 2010. A determination is then made as to whether another location is desired to obtain data from 2012. If yes, the device is transported to another location 2004 and the method 2000 starts again. If no more locations are desired, the flow ends 2014.

Figure 21:
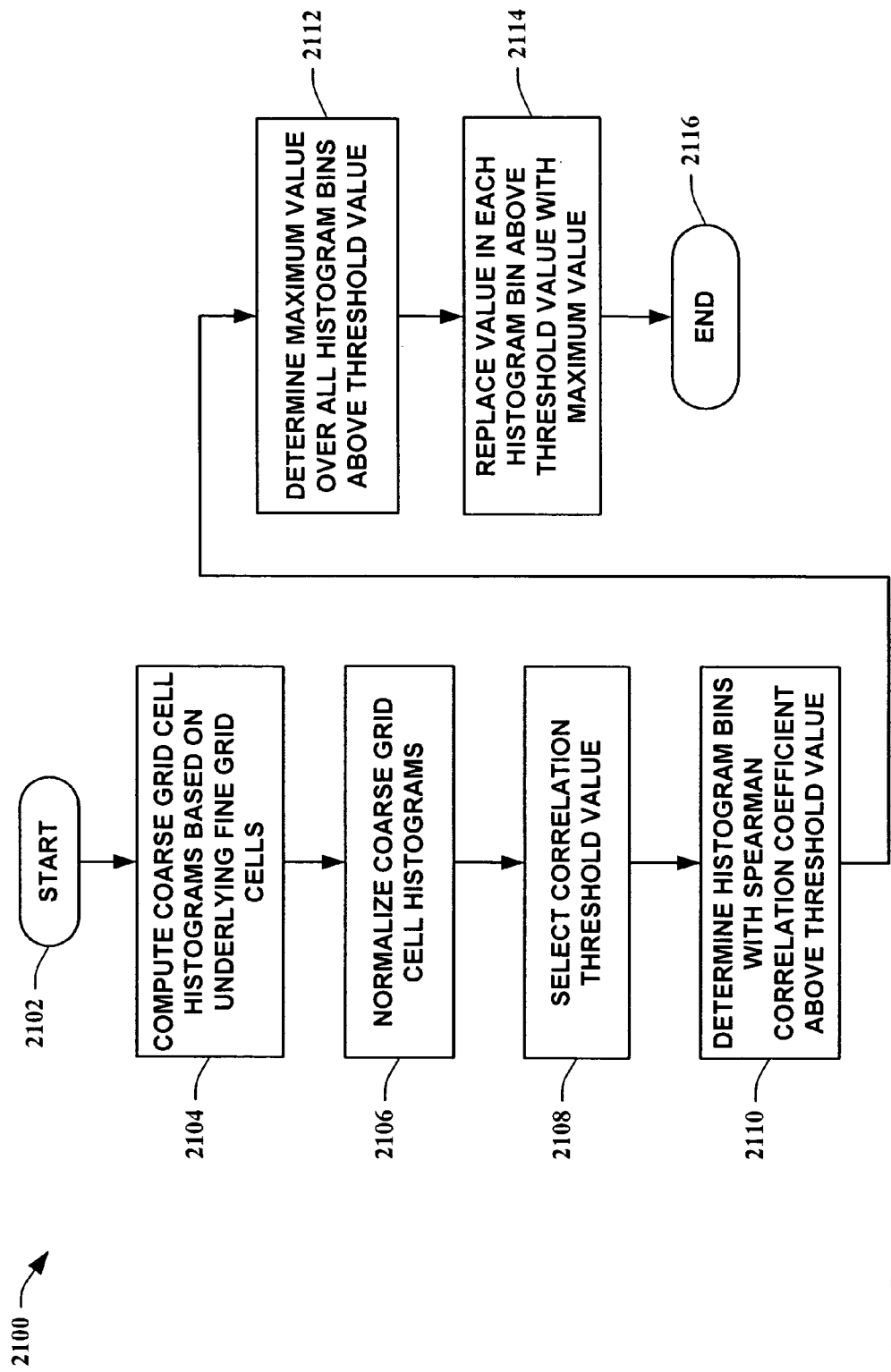
FIG. 21 is a flow diagram of a method of smoothing histograms utilized for locating a device in accordance with an aspect of the present invention.

In FIG. 21, a flow diagram of a method 2100 of smoothing histograms utilized for locating a device in accordance with an aspect of the present invention is shown. The method 2100 starts 2102 by computing coarse grid cell histograms based on underlying fine grid cells 2104. By utilizing a coarse grid instead of a fine grid provided by simulation software such as ComStudy and the like, a reasonable resolution is obtained without causing heavy storage and processing burdens on an underlying device. The coarse grid cell histograms are then normalized 2106. This provides an estimate of a probability distribution of rank hash codes for a cell. A correlation threshold value is then selected 2108. This permits control of smoothing of sparsely populated histograms, with higher values giving more smoothing. Histogram bins with Spearman correlation coefficients above the correlation threshold value are then determined 2110. A maximum value over all histogram bins that are above the correlation threshold value is calculated 2112. Each histogram bin above the correlation threshold value has its value replaced by the maximum value 2114, ending the flow 2116. In equation form, the smoothed likelihood is computed as:

$$P_u(r \mid c) = \max_{r': S(r,r') \geq \rho_s} P'(r' \mid c) \quad (3)$$

where $S(r, r')$ is a Spearman correlation coefficient between rank vectors represented by hash codes r and r'. $P_u(r \mid c_i)$ is then normalized over r into $P(r \mid c_i)$ to give a smoothed likelihood function of a rank hash code given a coarse cell.

Figure 22:
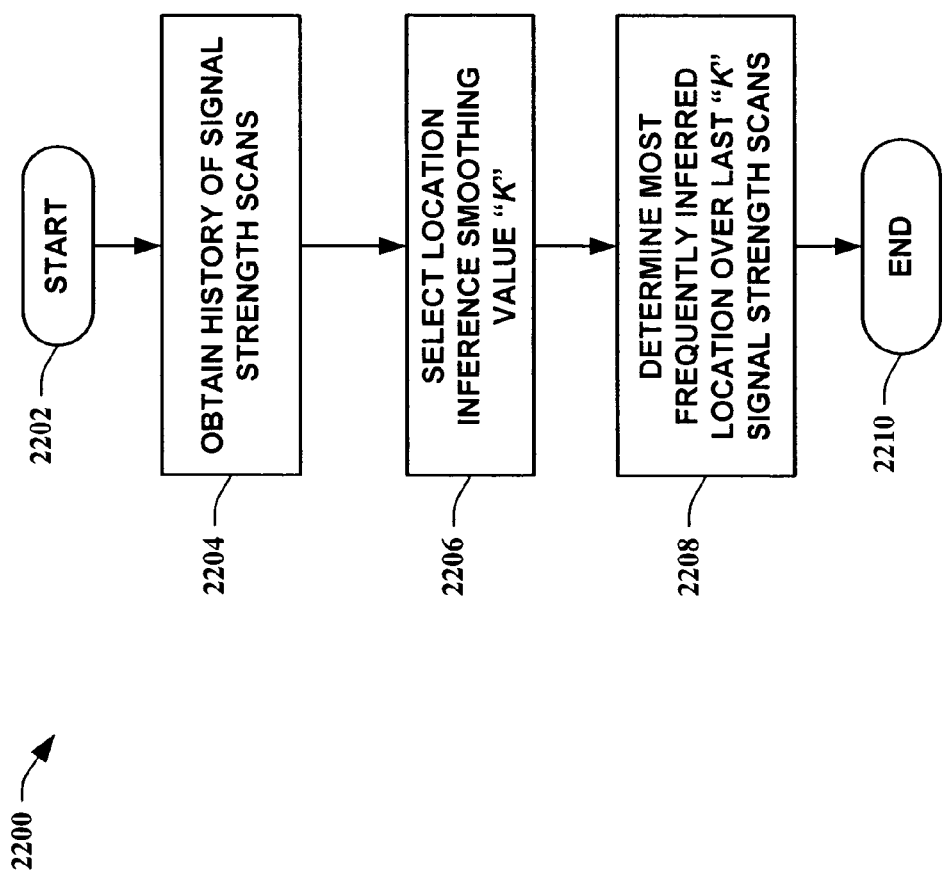
FIG. 22 is a flow diagram of a method of smoothing location inferences in accordance with an aspect of the present invention.

Referring to FIG. 22, a flow diagram of a method 2200 of smoothing location inferences in accordance with an aspect of the present invention is depicted. The method 2200 starts 2202 by obtaining a history of signal strength scans 2204. A location inference smoothing value "K" (temporal window size) is then selected 2206. A most frequently inferred location over the last "K" signal strength scans is then determined 2208, ending the flow 2210. The most frequently inferred location becomes the location utilized for an underlying device. This is frequently done to prevent the device from "jumping" from location to location due to orientation movement of the device and other environmental influences. By smoothing the inferenced location, a substantially steady value is shown by the device.

Figure 23:
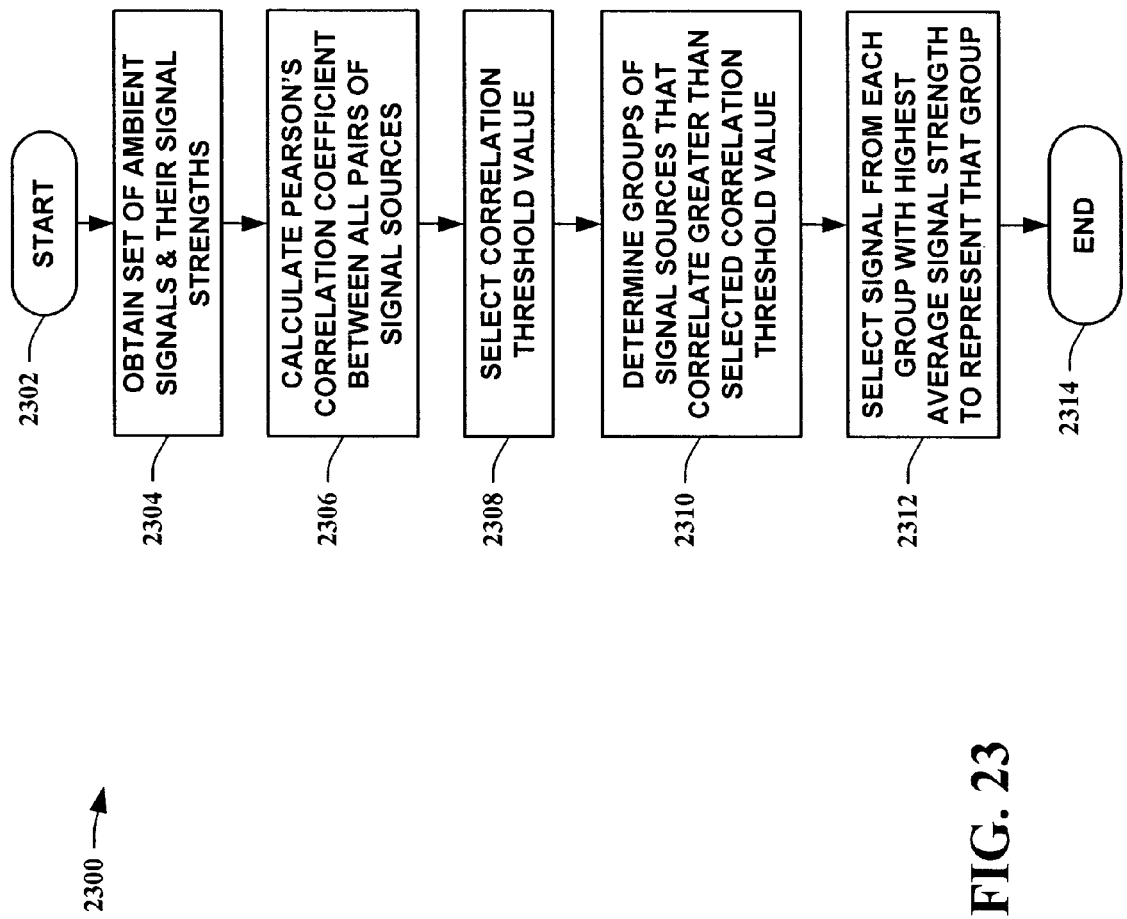
FIG. 23 is a flow diagram of a method of optimizing ambient signal sets for utilization in locating a device in accordance with an aspect of the present invention.

Moving on to FIG. 23, a flow diagram of a method 2300 of optimizing ambient signal sets for utilization in locating a device in accordance with an aspect of the present invention is shown. The method 2300 starts 2302 by obtaining a set of ambient signals and their respective signal strengths 2304. A Pearson's correlation coefficient is then calculated between all pairs of signal sources in the set 2306. In one instance of the present invention, pairing of signal sources is based upon spatially corresponding points on a simulated signal strength map and the like. Pearson's correlation coefficient represents a standard linear correlation coefficient and not a rank correlation. A correlation threshold value is then selected 2308. A typical value for this correlation threshold in one instance of the present invention is approximately 0.95. Signal sources that correlate greater than the selected correlation threshold value are grouped together 2310. A signal with the highest average signal strength of each group is then selected to represent that group 2312, ending the flow 2314. This method 2300 reduces the number of rank vectors to be utilized in locating a device by several orders of magnitude. It 2300 is also particularly useful when ambient signals originate from a single source, eliminating source redundancy.

Instances of the present invention can include inclusion of a means for accepting input and/or feedback from users either on a programming device and/or an endpoint device itself. Such input can include regions that a user wishes to exclude from inference, e.g., "only consider this particular subset of areas within this greater city region; I will not be traveling in other areas." Such constraints can enhance the accuracy of the inferences of a system by narrowing the scope of locations. In another instance of the present invention, users can input feedback about the accuracy of a system, e.g., "this is incorrect; this is correct," e.g., via simple button pushes. Such feedback can be used to enhance the accuracy of future inferences.

Figure 24:
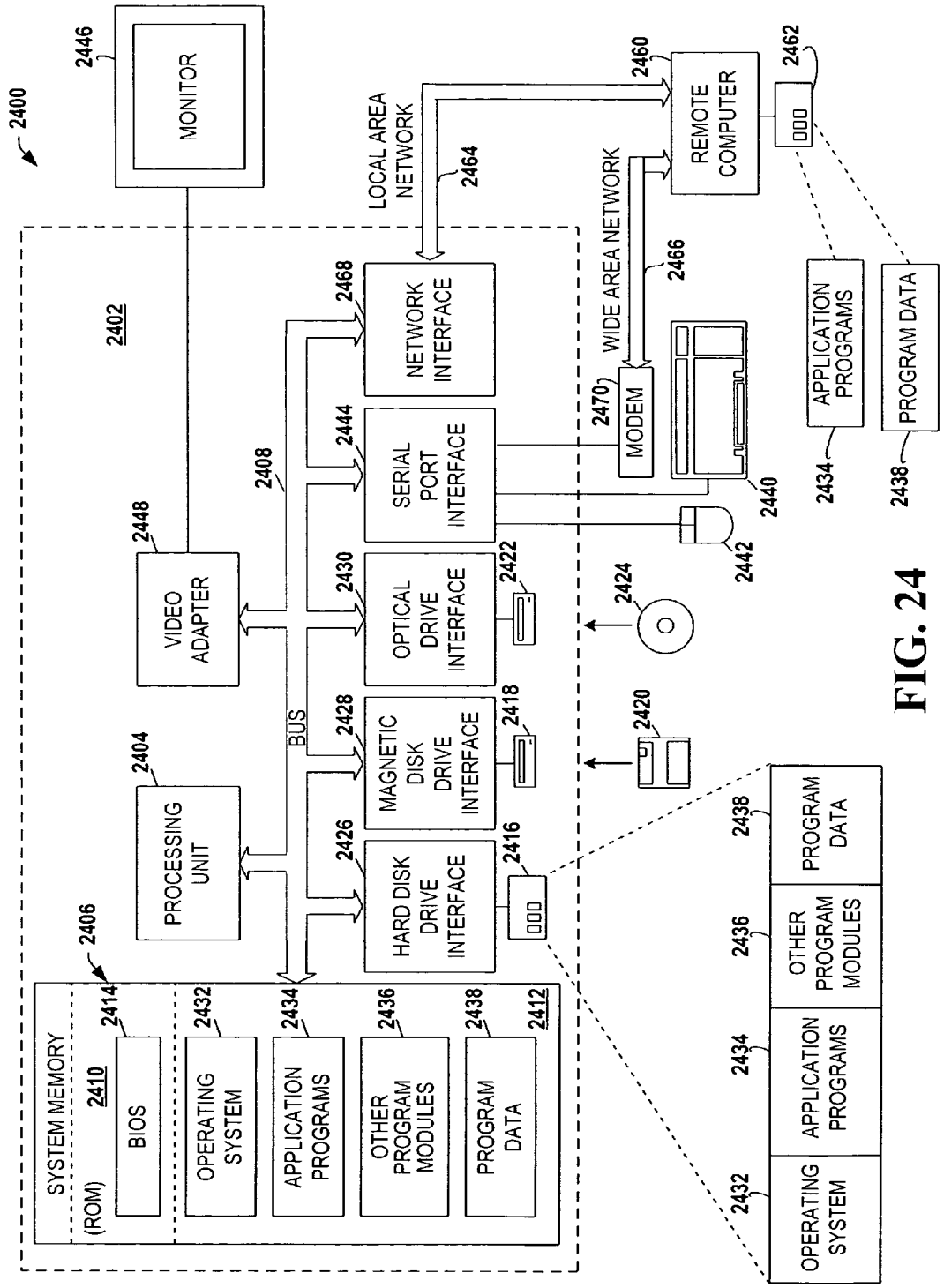
FIG. 24 illustrates an example operating environment in which the present invention can function.

In order to provide additional context for implementing various aspects of the present invention, FIG. 24 and the following discussion is intended to provide a brief, general description of a suitable computing environment 2400 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on standalone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 24, an exemplary system environment 2400 for implementing the various aspects of the invention includes a conventional computer 2402, including a processing unit 2404, a system memory 2406, and a system bus 2408 that couples various system components, including the system memory, to the processing unit 2404. The processing unit 2404 may be any commercially available or proprietary processor. In addition, the processing unit may be implemented as multi-processor formed of more than one processor, such as may be connected in parallel.

The system bus 2408 may be any of several types of bus structure including a memory bus or memory controller, a peripheral bus, and a local bus using any of a variety of conventional bus architectures such as PCI, VESA, Microchannel, ISA, and EISA, to name a few. The system memory 2406 includes read only memory (ROM) 2410 and random access memory (RAM) 2412. A basic input/output system (BIOS) 2414, containing the basic routines that help to transfer information between elements within the computer 2402, such as during start-up, is stored in ROM 2410.

The computer 2402 also may include, for example, a hard disk drive 2416, a magnetic disk drive 2418, e.g., to read from or write to a removable disk 2420, and an optical disk drive 2422, e.g., for reading from or writing to a CD-ROM disk 2424 or other optical media. The hard disk drive 2416, magnetic disk drive 2418, and optical disk drive 2422 are connected to the system bus 2408 by a hard disk drive interface 2426, a magnetic disk drive interface 2428, and an optical drive interface 2430, respectively. The drives 2416-2422 and their associated computer-readable media provide nonvolatile storage of data, data structures, computer-executable instructions, etc. for the computer 2402. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 2400, and further that any such media may contain computer-executable instructions for performing the methods of the present invention.

A number of program modules may be stored in the drives 2416-2422 and RAM 2412, including an operating system 2432, one or more application programs 2434, other program modules 2436, and program data 2438. The operating system 2432 may be any suitable operating system or combination of operating systems. By way of example, the application programs 2434 and program modules 2436 can include inferring a location of a device in accordance with an aspect of the present invention.

A user can enter commands and information into the computer 2402 through one or more user input devices, such as a keyboard 2440 and a pointing device (e.g., a mouse 2442). Other input devices (not shown) may include a microphone, a joystick, a game pad, a satellite dish, wireless remote, a scanner, or the like. These and other input devices are often connected to the processing unit 2404 through a serial port interface 2444 that is coupled to the system bus 2408, but may be connected by other interfaces, such as a parallel port, a game port or a universal serial bus (USB). A monitor 2446 or other type of display device is also connected to the system bus 2408 via an interface, such as a video adapter 2448. In addition to the monitor 2446, the computer 2402 may include other peripheral output devices (not shown), such as speakers, printers, etc.

It is to be appreciated that the computer 2402 can operate in a networked environment using logical connections to one or more remote computers 2460. The remote computer 2460 may be a workstation, a server computer, a router, a peer device or other common network node, and typically includes many or all of the elements described relative to the computer 2402, although, for purposes of brevity, only a memory storage device 2462 is illustrated in FIG. 24. The logical connections depicted in FIG. 24 can include a local area network (LAN) 2464 and a wide area network (WAN) 2466. Such networking environments are commonplace in offices, enterprise-wide computer networks, intranets and the Internet.

When used in a LAN networking environment, for example, the computer 2402 is connected to the local network 2464 through a network interface or adapter 2468. When used in a WAN networking environment, the computer 2402 typically includes a modem (e.g., telephone, DSL, cable, etc.) 2470, or is connected to a communications server on the LAN, or has other means for establishing communications over the WAN 2466, such as the Internet. The modem 2470, which can be internal or external relative to the computer 2402, is connected to the system bus 2408 via the serial port interface 2444. In a networked environment, program modules (including application programs 2434) and/or program data 2438 can be stored in the remote memory storage device 2462. It will be appreciated that the network connections shown are exemplary, and other means (e.g., wired or wireless) of establishing a communications link between the computers 2402 and 2460 can be used when carrying out an aspect of the present invention.

In accordance with the practices of persons skilled in the art of computer programming, the present invention has been described with reference to acts and symbolic representations of operations that are performed by a computer, such as the computer 2402 or remote computer 2460, unless otherwise indicated. Such acts and operations are sometimes referred to as being computer-executed. It will be appreciated that the acts and symbolically represented operations include the manipulation by the processing unit 2404 of electrical signals representing data bits which causes a resulting transformation or reduction of the electrical signal representation, and the maintenance of data bits at memory locations in the memory system (including the system memory 2406, hard drive 2416, floppy disks 2420, CD-ROM 2424, and remote memory 2462) to thereby reconfigure or otherwise alter the computer system's operation, as well as other processing of signals. The memory locations where such data bits are maintained are physical locations that have particular electrical, magnetic, or optical properties corresponding to the data bits.

Figure 25:
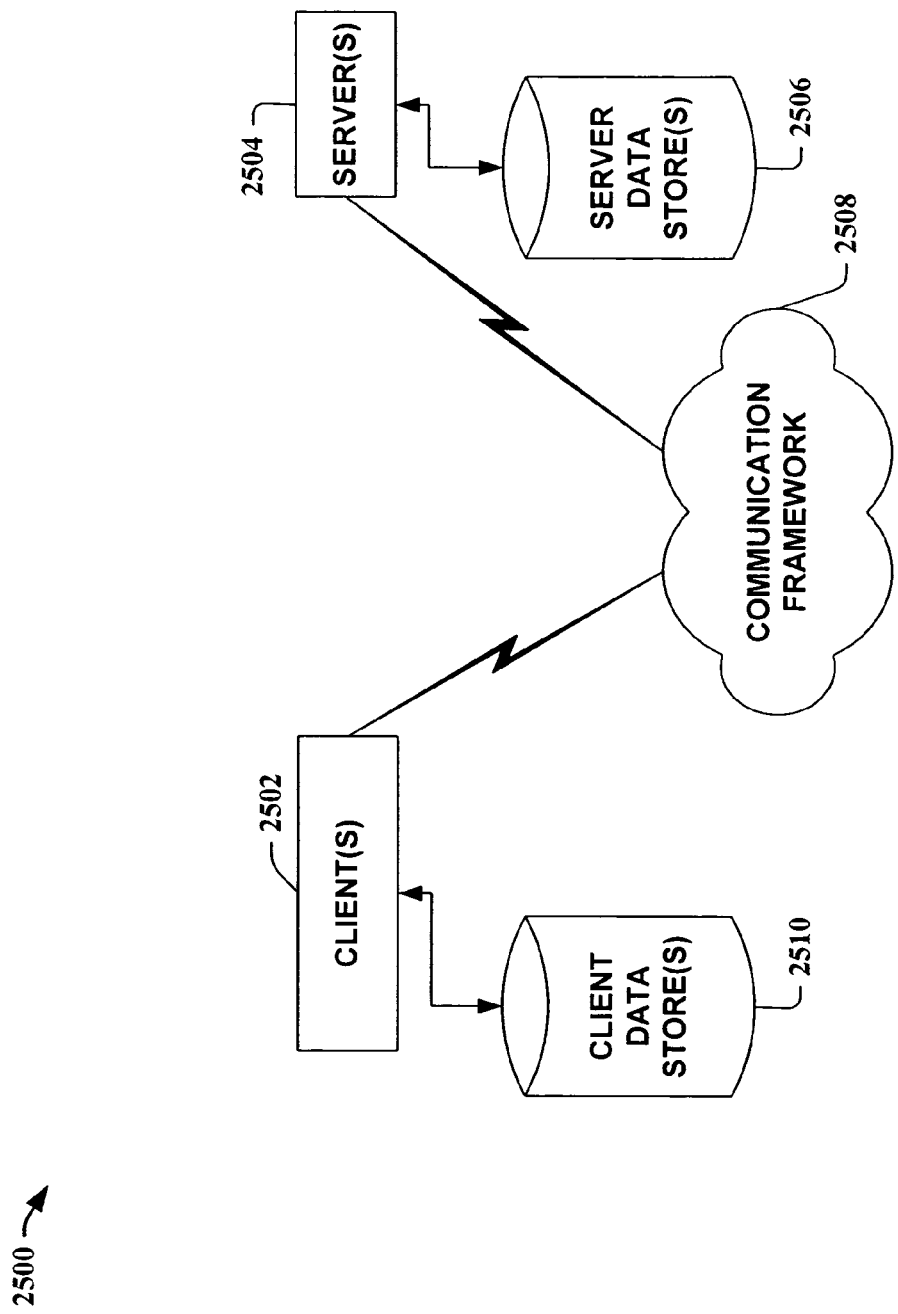
FIG. 25 illustrates another example operating environment in which the present invention can function.

FIG. 25 is another block diagram of a sample computing environment 2500 with which the present invention can interact. The system 2500 further illustrates a system that includes one or more client(s) 2502. The client(s) 2502 can be hardware and/or software (e.g., threads, processes, computing devices). The system 2500 also includes one or more server(s) 2504. The server(s) 2504 can also be hardware and/or software (e.g., threads, processes, computing devices). The server(s) 2504 can house threads to perform transformations by employing the present invention, for example. One possible communication between a client 2502 and a server 2504 may be in the form of a data packet adapted to be transmitted between two or more computer processes. The system 2500 includes a communication framework 2508 that can be employed to facilitate communications between the client(s) 2502 and the server(s) 2504. The client(s) 2502 are operably connected to one or more client data store(s) 2510 that can be employed to store information local to the client(s) 2502. Similarly, the server(s) 2504 are operably connected to one or more server data store(s) 2506 that can be employed to store information local to the server(s) 2504.

In one instance of the present invention, a data packet transmitted between two or more computer components that facilitate locating a device, the data packet is comprised of, at least in part, information relating to a locating system that determines, based on at least one ambient frequency signal indicator, an approximation of a location of a device.

In another instance of the present invention, a computer readable medium storing computer executable components of a system for facilitating locating a device is comprised of, at least in part, a locating system that determines, based on at least one ambient frequency signal indicator, an approximation of a location of a device.

In yet another instance of the present invention, a location is determined based upon signal strength indicators based upon mobile and/or stationary signal emitters. Data transmitted from mobile units is utilized to provide stabilization for determining a location.

In still yet another instance of the present invention, radiation patterns of signal emitters are utilized in the determination of a location.

It is to be appreciated that the systems and/or methods of the present invention can be utilized in locating systems facilitating computer components and non-computer related components alike. Further, those skilled in the art will recognize that the systems and/or methods of the present invention are employable in a vast array of electronic related technologies, including, but not limited to, computers, servers and/or handheld electronic devices, affixable electronic devices (e.g., magnetic attachment, hook and loop attachment, hook attachment, adhesive attachment, etc.), wearable electronic devices (e.g., watches, eye glasses, clothing items, hearing aids, necklaces, bracelets, belts, ankle bracelets, tie tacks, rings, etc.), and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a signal component that receives a plurality of ambient signals from a plurality of commercial FM radio station transmitters that each provide at least one ambient signal used by a device to determine at least one approximate location of the device;
a ranking component that computes a rank vector of at least the subset of the ambient signals based at least in part on relative signal strengths between the subset of ambient signals and maps the rank vector to an integer;
an analysis component that infers the at least one approximate location of the device based, in part, on comparing the integer to a plurality of hash codes related to one or more disparate permutations of the rank vector; and
a training component for training the analysis component based at least in part on the one or more hash codes corresponding to the one or more permutations of the rank vector and a related location, the one or more rank vectors are computed based at least in part on relative signal strength of the ambient radio signals at the related location;
wherein each ambient signal is associated with a commercial FM radio station.

2. The system of claim 1, the approximate location inferred by the analysis component being utilized by an entity in real-time.

3. The system of claim 1, the analysis component provides smoothing of at least one inferred approximate location of the device.

4. The system of claim 3, the smoothing comprising obtaining a most frequently inferred location over a variable number of prior signal strength scans.

5. The system of claim 4, the variable number comprising a temporal window, K, representing a number of signal scans over a period of time.

6. The system of claim 1, the analysis component provides optimization of the subset of ambient signals to substantially reduce their number.

7. The system of claim 6, the optimization utilizes a degree of correlation to facilitate in number reduction.

8. The system of claim 7, the degree of correlation comprising a Pearson's correlation coefficient between pairs of ambient signals based on at least one spatially corresponding signal source location.

9. The system of claim 7, the optimization employs at least one correlation threshold value, $\rho$.

10. The system of claim 9, the correlation threshold value is approximately equal to 0.95.

11. The system of claim 1, the ambient signal comprising at least one radio frequency (RF) signal.

12. The system of claim 11, the device can only receive RF signals.

13. The system of claim 11, the RF signals comprising at least one selected from the group consisting of 802.11 signals, amplitude modulation (AM) radio signals, frequency modulation (FM) radio signals, television broadcast signals, commercial radio signals, and military radio signals.

14. The system of claim 1, the ambient signal comprising at least one selected from the group consisting of an infrared signal, an x-ray signal, an infrasonic signal, a sonic signal, and an ultrasonic signal.

15. The system of claim 1, the ranking component generates a unique rank hash code for each permutation of respective signal strengths.

16. The system of claim 15, the analysis component utilizes at least one histogram of at least one rank hash code to facilitate in classifying the approximate location of the device.

17. The system of claim 16, the analysis component utilizes a smoothing technique on at least one histogram.

18. The system of claim 17, the smoothing technique comprising a process employing at least one Spearman correlation coefficient relating to at least one histogram.

19. The system of claim 17, the smoothing technique utilizes a correlation threshold value, $\rho_s$.

20. The system of claim 19, the correlation threshold value is approximately equal to 0.9.

21. The system of claim 1, the analysis component approximates a discrete probability distribution of hash codes obtained at a particular location.

22. The system of claim 1, the analysis component utilizes, in a statistical analysis, at least one selected from the group consisting of time varying signal strengths from one or more signal emitters and static signal strengths from one or more signal emitters.

23. The system of claim 1, the analysis component utilizing at least one propagation model.

24. The system of claim 23, the propagation model comprising at least, in part, a terrain sensitive radio propagation model.

25. The system of claim 1 further comprising a global positioning system component (GPS).

26. The system of claim 1 further comprising a velocity component that determines or infers velocity of the device based, in part, on relative signal strengths of the subset of the ambient signals.

27. The system of claim 1 further comprising adaptively downloadable look-up tables.

28. The system of claim 1, the one or more disparate permutations of the rank vector relate to rank vectors computed from at least the subset of ambient signals at a plurality of corresponding locations.

29. The system of claim 28, the signal strength simulation component provides signal strength data for at least one desired area to the analysis component.

30. The system of claim 29, the signal strength data comprising data based on grid system overlying the desired area.

31. The system of claim 1, the analysis component further utilizing at least one time-based information source to facilitate in determining the approximate location of the device.

32. A system, comprising:
- means for receiving a plurality of disparate ambient radio signals, the disparate ambient radio signals are from a plurality of commercial FM radio station transmitters that each provide at least one ambient signal used by a device to determine at least one approximate location of the device;
- means for computing a rank vector based at least in part on relative strength of the disparate ambient radio signals and mapping the rank vector to an integer;
- means for inferring the approximate location of the device based, in part, on comparing the integer to one or more hash codes corresponding to one or more permutations of the rank vector; and
- means for training the means for inferring based at least in part on the one or more hash codes corresponding to the one or more permutations of the rank vector and a related location, the one or more rank vectors are computed based at least in part on relative signal strength of the disparate ambient radio signals at the related location.

33. The system of claim 32, the disparate ambient radio signals comprising at least one radio frequency (RF) signal.

34. A computer readable medium having stored thereon computer executable components of the system of claim 1.

35. A device employing the system of claim 1 comprising at least one selected from the group consisting of a computer, a server, a wearable electronic device, an affixable electronic device, and a handheld electronic device.

36. A system, comprising:
- a signal component that receives a plurality of ambient signals from a plurality of commercial FM radio station transmitters that each provide at least one ambient signal used by a device to determine at least one approximate location of the device;
- a ranking component that computes a rank vector of at least the subset of the ambient signals based at least in part on relative signal strengths between the subset of ambient signals and maps the rank vector to an integer;
- an analysis component that infers the at least one approximate location of the device based, in part, on comparing the integer to a plurality of hash codes related to one or more disparate permutations of the rank vector; and
- a training component for training the analysis component based at least in part on the one or more hash codes corresponding to the one or more permutations of the rank vector and a related location, the one or more rank vectors are computed based at least in part on relative signal strength of the ambient radio signals at the related location.

* * * * *